US012446005B2

(12) United States Patent
Ding et al.

(10) Patent No.: US 12,446,005 B2
(45) Date of Patent: Oct. 14, 2025

(54) DATA TRANSMISSION METHOD, APPARATUS, AND SYSTEM

(71) Applicant: HUAWEI TECHNOLOGIES CO., LTD., Shenzhen (CN)

(72) Inventors: Mengying Ding, Shanghai (CN); Shuri Liao, Shanghai (CN); Peng Zhang, Shanghai (CN); Hua Xu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 450 days.

(21) Appl. No.: 17/843,771

(22) Filed: Jun. 17, 2022

(65) Prior Publication Data
US 2022/0330209 A1 Oct. 13, 2022

Related U.S. Application Data

(63) Continuation of application No. PCT/CN2019/126893, filed on Dec. 20, 2019.

(51) Int. Cl.
H04W 4/00 (2018.01)
H04W 72/02 (2009.01)
(Continued)

(52) U.S. Cl.
CPC ........ *H04W 72/02* (2013.01); *H04W 72/0446* (2013.01); *H04W 72/0453* (2013.01); *H04W 72/23* (2023.01)

(58) Field of Classification Search
CPC ............. H04W 72/02; H04W 72/0446; H04W 72/0453; H04W 72/23; H04W 28/086;
(Continued)

(56) References Cited

U.S. PATENT DOCUMENTS

2018/0092122 A1 3/2018 Babaei et al.
2018/0132210 A1 5/2018 Rico Alvarino et al.
(Continued)

FOREIGN PATENT DOCUMENTS

CN 107615844 A 1/2018
CN 108632743 A 10/2018
(Continued)

OTHER PUBLICATIONS

Extended European Search Report issued in corresponding European Application No. 19956454.3, dated Nov. 7, 2022, pp. 1-8.
(Continued)

Primary Examiner — Chuong T Ho
(74) Attorney, Agent, or Firm — HAUPTMAN HAM, LLP

(57) ABSTRACT

This application provides a data transmission method and an apparatus, and may be applied to fields such as user equipment cooperation, sidelink relay, user relay, and internet of vehicles. A first terminal apparatus receives at least two pieces of downlink control information from a first network apparatus in a first slot, where the at least two pieces of downlink control information include first downlink control information and second downlink control information, the first downlink control information is used to indicate a first sidelink resource used by the first terminal apparatus to send first sidelink information to a second terminal apparatus, and the second downlink control information is used to indicate a second sidelink resource used by the first terminal apparatus to send second sidelink information to a third terminal apparatus.

20 Claims, 16 Drawing Sheets

(51) Int. Cl.
*H04W 72/0446* (2023.01)
*H04W 72/0453* (2023.01)
*H04W 72/23* (2023.01)

(58) Field of Classification Search
CPC .... H04W 72/20; H04W 28/12; H04L 5/0037;
H04L 5/0044; H04L 5/0053
USPC .................................................. 370/329, 330
See application file for complete search history.

(56) References Cited

U.S. PATENT DOCUMENTS

| | | | |
|---|---|---|---|
| 2019/0173612 A1* | 6/2019 | Kimura | H04L 1/0063 |
| 2019/0335435 A1* | 10/2019 | Gou | H04L 1/0687 |
| 2019/0342910 A1 | 11/2019 | Cao et al. | |
| 2020/0084789 A1* | 3/2020 | Wang | H04L 1/1614 |
| 2020/0213044 A1* | 7/2020 | Peng | H04L 1/1864 |
| 2021/0029719 A1* | 1/2021 | Zhou | H04L 5/0055 |
| 2021/0105126 A1* | 4/2021 | Yi | H04L 1/1671 |
| 2021/0127396 A1* | 4/2021 | Su | H04W 72/1263 |
| 2021/0185715 A1* | 6/2021 | Shen | H04L 5/0023 |

FOREIGN PATENT DOCUMENTS

| | | |
|---|---|---|
| CN | 110224796 A | 9/2019 |
| CN | 110392431 A | 10/2019 |
| EP | 3567944 A1 | 11/2019 |
| WO | 2016165124 A1 | 10/2016 |
| WO | 2019027242 A1 | 2/2019 |

OTHER PUBLICATIONS

VIVO, "Discussion on mode 1 resource allocation mechanism", 3GPP TSG RAN WG1 Meeting#98bis R1-1910212, Oct. 20, 2019, total 15 pages.

Interdigital Inc., "On NR Sidelink Mode 1 Resource Allocation", 3GPP TSG RAN WG1 #97 R1-1907092, May 17, 2019, total 3 pages.

International Search Report issued in corresponding International Application No. PCT/CN2019/126893, dated Aug. 28, 2020, pp. 1-9.

Chinese Office Action issued in corresponding Chinese Application No. 201980102558.1, dated Feb. 22, 2024, pp. 1-11.

European Office Action issued in corresponding European Application No. 19956454.3, dated Oct. 4, 2024, pp. 1-5.

* cited by examiner

DATA TRANSMISSION METHOD, APPARATUS, AND SYSTEM

CROSS-REFERENCE TO RELATED APPLICATIONS

This application is a continuation of International Application No. PCT/CN2019/126893, filed on Dec. 20, 2019, the disclosure of which is hereby incorporated in entirety by reference.

BACKGROUND

User equipment cooperation (User Equipment Cooperation, UE cooperation) is one of main features supported by a next generation communication system, and significantly improves a capacity of the system and coverage of a network. In a user equipment cooperation scenario, when a first terminal apparatus sends data to a first network apparatus, the first terminal apparatus sends the data to cooperation terminal apparatuses such as a second terminal apparatus and a third terminal apparatus over sidelinks. After receiving the data, the second terminal apparatus and the third terminal apparatus send the data to the first network apparatus, so that an uplink transmission capability of the first terminal apparatus is improved.

In current technologies, the first network apparatus sends, to one terminal apparatus in one subframe, scheduling information carried on a physical downlink control channel (Physical Downlink Control Channel, PDCCH). The first network apparatus sequentially sends, to the second terminal apparatus and the third terminal apparatus in a plurality of subframes, the scheduling information carried on the physical downlink control channel. After receiving the scheduling information, the first terminal apparatus sequentially sends data to the second terminal apparatus and the third terminal apparatus over sidelinks. Consequently, an excessively long delay is caused in a data transmission process.

SUMMARY

This application provides a data transmission method, an apparatus, and a system, to reduce a data transmission delay.

According to a first aspect, a data transmission method is provided. The method is performed by a first terminal apparatus. The first terminal apparatus is a module or a chip in the first terminal apparatus. The first terminal apparatus alternatively is a chip or a system on chip. The method includes: receiving at least two pieces of downlink control information from a first network apparatus in a first slot, where the at least two pieces of downlink control information include first downlink control information and second downlink control information, the first downlink control information is used to indicate to send first sidelink information to a second terminal apparatus on a first sidelink resource, the second downlink control information is used to indicate to send second sidelink information to a third terminal apparatus on a second sidelink resource, and the at least two pieces of downlink control information are further used to determine a sequence of transport blocks included in the first sidelink information and a sequence of transport blocks included in the second sidelink information; sending the first sidelink information to the second terminal apparatus on the first sidelink resource; and sending the second sidelink information to the second terminal apparatus on the second sidelink resource.

According to this embodiment of this application, the first terminal apparatus receives several pieces of downlink control information from the first network apparatus in the first slot. These pieces of downlink control information are used to indicate a resource for sidelink communication between the first terminal apparatus and another terminal apparatus. The downlink control information is further used to indicate a sequence of transport blocks included in pieces of sidelink data, to indicate a position sequence or a sequence relationship of data blocks in a data flow or an uplink data buffer, where the data blocks are in the sidelink data simultaneously transmitted on a plurality of sidelinks. The manner provided in this embodiment of this application in which the first terminal apparatus centrally receives different downlink control information in one slot is compared with a manner in which the first network apparatus sequentially sends different downlink control information to the first terminal apparatus in different slots. A delay in a control information delivery process is reduced, and efficiency of an overall cooperation transmission process is improved.

In a possible design, that the at least two pieces of downlink control information are further used to determine a sequence of transport blocks included in the first sidelink information and a sequence of transport blocks included in the second sidelink information includes: the first downlink control information and the second downlink control information are carried in a first control resource set CORESET and a second control resource set CORESET respectively; and sidelink information indicated by control information carried in the first control resource set includes a former data block, and sidelink information indicated by control information carried in the second control resource set includes a latter data block; or sidelink information indicated by control information carried in the first control resource set includes a latter data block, and sidelink information indicated by control information carried in the second control resource set includes a former data block.

In this embodiment of this application, when downlink control information is carried in a control resource set, a sequence of transport blocks included in sidelink information indicated by the downlink control information transmitted in each CORESET is determined based on a correspondence between an ID of a control resource set (Control resource set, CORESET) and a transport block TB, to determine a sequence of data blocks included in the first sidelink information that is sent by the first terminal apparatus to the second terminal apparatus on the first sidelink resource. For example, when the first resource control set carries first downlink control information (Downlink Control Information, DCI), the data block included in the first sidelink information is TB 0. When the second resource control set carries DCI 1, the data block included in the first sidelink information is TB 1. Similarly, corresponding rules are opposite. According to the method in this embodiment, a relative sequence of data blocks included in sidelink information that is sent simultaneously is determined.

In a possible design, that the at least two pieces of downlink control information are further used to determine a sequence of transport blocks included in the first sidelink information and a sequence of transport blocks included in the second sidelink information includes: the first downlink control information is scrambled by using a first radio temporary identifier, and the second downlink control information is scrambled by using a second radio temporary identifier; and the first radio temporary identifier indicates that the first sidelink information indicated by the first downlink control information includes a former data block, and the second radio temporary identifier indicates that the second sidelink information indicated by the second downlink control information includes a latter data block; or the first radio temporary identifier indicates that the first sidelink information indicated by the first downlink control information includes a latter data block, and the second radio temporary identifier indicates that the second sidelink information indicated by the second downlink control information includes a former data block.

In this embodiment of this application, scrambling information of downlink control information is used to determine a sequence of data blocks in sidelink information. A correspondence between the scrambling information and the data blocks are determined based on a natural size correspondence, or a correspondence is configured by using higher layer signaling. In this case, the downlink control information, the data blocks included in the sidelink data, and a target terminal of sidelink transmission are in a one-to-one correspondence.

In a possible design, that the at least two pieces of downlink control information are further used to determine a sequence of transport blocks included in the first sidelink information and a sequence of transport blocks included in the second sidelink information includes: the first downlink control information includes first indication information, and the second downlink control information includes second indication information; and the first indication information indicates that the first sidelink information indicated by the first downlink control information includes a former data block, and the second indication information indicates that the second sidelink information indicated by the second downlink control information includes a latter data block; or the first indication information indicates that the first sidelink information indicated by the first downlink control information includes a latter data block, and the second indication information indicates that the second sidelink information indicated by the second downlink control information includes a former data block.

In this embodiment of this application, indication information in downlink control information is used to determine a sequence of data blocks in sidelink information. For example, the indication information is a hybrid automatic repeat request number, or is other indication information. In this simple and clear manner, a correspondence between the downlink control information, the data blocks included in the sidelink data, and a target terminal of sidelink transmission is indicated.

In a possible design, the former data block is TB 0, and the latter data block is TB 1.

According to this embodiment of this application, a sequence relationship of data blocks included in sidelink information is determined, so that a relationship of data blocks included in a plurality of pieces of simultaneously transmitted sidelink information is clearer.

In a possible design, a time domain resource for the first sidelink resource is the same as a time domain resource for the second sidelink resource, and a frequency domain resource for the first sidelink resource does not overlap a frequency domain resource for the second sidelink resource; a time domain resource for the first sidelink resource does not overlap a time domain resource for the second sidelink resource; or a time domain resource for the first sidelink resource is the same as a time domain resource for the second sidelink resource, a frequency domain resource for the first sidelink resource is the same as a frequency domain resource for the second sidelink resource, and an antenna port used to transmit the first sidelink information on the first sidelink resource is different from an antenna port used to transmit the second sidelink information on the second sidelink resource.

According to this embodiment of this application, the first terminal apparatus uses the first sidelink resource to transmit sidelink information to the second terminal apparatus, and the first terminal apparatus uses the second sidelink resource to transmit the sidelink information to the third terminal apparatus. The first sidelink resource and the second sidelink resource is time division multiplexed, frequency division multiplexed, or space division multiplexed. The first terminal apparatus simultaneously sends two or more pieces of sidelink information to the second terminal apparatus and the third terminal apparatus in one slot or a small time unit, that is, simultaneously send two or more pieces of sidelink data to a plurality of cooperation terminal apparatuses in one slot. Compared with a manner of sequentially sending the sidelink data to different terminal apparatuses in different slots or different time units, this method reduces a delay in a sidelink transmission phase, and further reduces a delay in an entire cooperation transmission process.

In a possible design, the first sidelink information and the second sidelink information are sent in the first slot; or the first sidelink information and the second sidelink information are sent in a second slot, where the second slot and the first slot are different slots.

According to this embodiment of this application, the first terminal apparatus sends several pieces of sidelink data in one slot, so that time is saved in a sidelink transmission phase, and a delay in an overall operation process is reduced. Further, if the first terminal apparatus receives a plurality of pieces of downlink control information in the first slot, and send side data to a plurality of terminal apparatuses based on the downlink control information, transmission efficiency is further improved.

A buffer status report is sent to the first network apparatus, where the buffer status report is used to determine the first downlink control information and the second downlink control information, and the buffer status report is used to indicate a data volume of transport blocks included in the first sidelink information and a data volume of transport blocks included in the second sidelink information.

In this embodiment of this application, the first terminal apparatus sends the buffer status report to the first network apparatus, for the first network apparatus to determine a data transmission condition of the first terminal apparatus and determine downlink control information based on the buffer status report. The first network apparatus schedules a resource based on an actual condition of the first terminal apparatus, thereby implementing dynamic and proper resource configuration.

According to a second aspect, a data transmission method is provided. The method is performed by a first network apparatus. The first network apparatus is a module or a chip in the first network apparatus. The first network apparatus alternatively is a chip or a system on chip. The method includes: The first network apparatus determines at least two pieces of downlink control information, where the at least two pieces of downlink control information include first downlink control information and second downlink control information, the first downlink control information is used to indicate a first sidelink resource used by a first terminal apparatus to send first sidelink information to a second terminal apparatus, and the second downlink control information is used to indicate a second sidelink resource used by the first terminal apparatus to send second sidelink information to a third terminal apparatus. The first network apparatus sends the at least two pieces of downlink control information to the first terminal apparatus in a first slot.

According to this embodiment of this application, the first terminal apparatus receives several pieces of downlink control information from the first network apparatus in the first slot. These pieces of downlink control information are used to indicate a resource for sidelink communication between the first terminal apparatus and another terminal apparatus. The downlink control information is further used to indicate a sequence of transport blocks included in pieces of sidelink data, to indicate a position sequence or a sequence relationship of data blocks in a data flow or an uplink data buffer, where the data blocks are in the sidelink data simultaneously transmitted on a plurality of sidelinks. The manner provided in this embodiment of this application in which the first terminal apparatus centrally receives different downlink control information in one slot is compared with a manner in which the first network apparatus sequentially sends different downlink control information to the first terminal apparatus in different slots. A delay in a control information delivery process is reduced, and efficiency of an overall cooperation transmission process is improved.

In a possible design, that the at least two pieces of downlink control information are further used to determine a sequence of transport blocks included in the first sidelink information and a sequence of transport blocks included in the second sidelink information includes: the first downlink control information and the second downlink control information are carried in a first control resource set CORESET and a second control resource set CORESET respectively; and sidelink information indicated by control information carried in the first control resource set includes a former data block, and sidelink information indicated by control information carried in the second control resource set includes a latter data block; or sidelink information indicated by control information carried in the first control resource set includes a latter data block, and sidelink information indicated by control information carried in the second control resource set includes a former data block.

In this embodiment of this application, when downlink control information is carried in a control resource set, a sequence of transport blocks included in sidelink information indicated by the downlink control information transmitted in each CORESET is determined based on a correspondence between an ID of a control resource set (Control resource set, CORESET) and a transport block TB, to determine a sequence of data blocks included in the first sidelink information that is sent by the first terminal apparatus to the second terminal apparatus on the first sidelink resource. For example, when the first resource control set carries first downlink control information (Downlink Control Information, DCI), the data block included in the first sidelink information is TB 0. When the second resource control set carries DCI 1, the data block included in the first sidelink information is TB 1. Similarly, corresponding rules are opposite. According to the method in this embodiment, a relative sequence of data blocks included in sidelink information that is sent simultaneously is determined.

In a possible design, that the at least two pieces of downlink control information are further used to determine a sequence of transport blocks included in the first sidelink information and a sequence of transport blocks included in the second sidelink information includes: the first downlink control information is scrambled by using a first radio temporary identifier, and the second downlink control information is scrambled by using a second radio temporary identifier; and the first radio temporary identifier indicates that the first sidelink information indicated by the first downlink control information includes a former data block, and the second radio temporary identifier indicates that the second sidelink information indicated by the second downlink control information includes a latter data block; or the first radio temporary identifier indicates that the first sidelink information indicated by the first downlink control information includes a latter data block, and the second radio temporary identifier indicates that the second sidelink information indicated by the second downlink control information includes a former data block.

In this embodiment of this application, scrambling information of downlink control information is used to determine a sequence of data blocks in sidelink information. A correspondence between the scrambling information and the data blocks are determined based on a natural size correspondence, or a correspondence is configured by using higher layer signaling. In this case, the downlink control information, the data blocks included in the sidelink data, and a target terminal of sidelink transmission are in a one-to-one correspondence.

In a possible design, that the at least two pieces of downlink control information are further used to determine a sequence of transport blocks included in the first sidelink information and a sequence of transport blocks included in the second sidelink information includes: the first downlink control information includes first indication information, and the second downlink control information includes second indication information; and the first indication information indicates that the first sidelink information indicated by the first downlink control information includes a former data block, and the second indication information indicates that the second sidelink information indicated by the second downlink control information includes a latter data block; or the first indication information indicates that the first sidelink information indicated by the first downlink control information includes a latter data block, and the second indication information indicates that the second sidelink information indicated by the second downlink control information includes a former data block.

In this embodiment of this application, indication information in downlink control information is used to determine a sequence of data blocks in sidelink information. For example, the indication information is a hybrid automatic repeat request number, or is other indication information. In this simple and clear manner, a correspondence between the downlink control information, the data blocks included in the sidelink data, and a target terminal of sidelink transmission is indicated.

In a possible design, the former data block is TB 0, and the latter data block is TB 1.

According to this embodiment of this application, a sequence relationship of data blocks included in sidelink information is determined, so that a relationship of data blocks included in a plurality of pieces of simultaneously transmitted sidelink information is clearer.

In a possible design, a time domain resource for the first sidelink resource is the same as a time domain resource for the second sidelink resource, and a frequency domain resource for the first sidelink resource does not overlap a frequency domain resource for the second sidelink resource; a time domain resource for the first sidelink resource does not overlap a time domain resource for the second sidelink resource; or a time domain resource for the first sidelink resource is the same as a time domain resource for the second sidelink resource, a frequency domain resource for the first sidelink resource is the same as a frequency domain resource for the second sidelink resource, and an antenna port used to transmit the first sidelink information on the first sidelink resource is different from an antenna port used to transmit the second sidelink information on the second sidelink resource.

According to this embodiment of this application, the first terminal apparatus uses the first sidelink resource to transmit sidelink information to the second terminal apparatus, and the first terminal apparatus uses the second sidelink resource to transmit the sidelink information to the third terminal apparatus. The first sidelink resource and the second sidelink resource is time division multiplexed, frequency division multiplexed, or space division multiplexed. The first terminal apparatus simultaneously sends two or more pieces of sidelink information to the second terminal apparatus and the third terminal apparatus in one slot or a small time unit, that is, simultaneously send two or more pieces of sidelink data to a plurality of cooperation terminal apparatuses in one slot. Compared with a manner of sequentially sending the sidelink data to different terminal apparatuses in different slots or different time units, this method reduces a delay in a sidelink transmission phase, and further reduces a delay in an entire cooperation transmission process.

In a possible design, the first sidelink information and the second sidelink information are sent in the first slot; or the first sidelink information and the second sidelink information are sent in a second slot, where the second slot and the first slot are different slots.

According to this embodiment of this application, the first terminal apparatus sends several pieces of sidelink data in one slot, so that time is saved in a sidelink transmission phase, and a delay in an overall operation process is reduced. Further, if the first terminal apparatus receives a plurality of pieces of downlink control information in the first slot, and send sidelink data to a plurality of terminal apparatuses based on the downlink control information, transmission efficiency is further improved.

A buffer status report is sent to the first network apparatus, where the buffer status report is used to determine the first downlink control information and the second downlink control information, and the buffer status report is used to indicate a data volume of transport blocks included in the first sidelink information and a data volume of transport blocks included in the second sidelink information.

In this embodiment of this application, the first terminal apparatus sends the buffer status report to the first network apparatus, for the first network apparatus to determine a data transmission condition of the first terminal apparatus and determine downlink control information based on the buffer status report. The first network apparatus schedules a resource based on an actual condition of the first terminal apparatus, thereby implementing dynamic and proper resource configuration.

In a possible design, first acknowledgement information from the second terminal apparatus is received, where the first acknowledgement information is used to indicate whether the second terminal apparatus successfully receives the first sidelink information; third downlink control information is determined based on the first acknowledgement information; the third downlink control information is sent to the second terminal apparatus, where the third downlink control information is used to indicate a first uplink resource or a third sidelink resource, the first uplink resource is used to transmit first uplink data, and the third sidelink resource is used to transmit third sidelink data; second acknowledgement information from the third terminal apparatus is received, where the second acknowledgement information is used to indicate whether the third terminal apparatus successfully receives the second sidelink information; fourth downlink control information is determined based on the second acknowledgement information; and the fourth downlink control information is sent to the third terminal apparatus, where the fourth downlink control information is used to indicate a second uplink resource or a fourth sidelink resource, the second uplink resource is used to transmit second uplink data, and the fourth sidelink resource is used to transmit fourth sidelink data. The first uplink data or the third sidelink data is determined based on a data block included in the first sidelink information, and the second uplink data or the fourth sidelink data is determined based on a data block included in the second sidelink information.

According to this embodiment of this application, the first network apparatus determines, by receiving the acknowledgement information of the second terminal apparatus and the third terminal apparatus, that the second terminal apparatus and the third terminal apparatus correctly receive the sidelink information from the first terminal apparatus and the data in the sidelink information. The first network apparatus configures an uplink resource or a downlink resource for the second terminal apparatus and the third terminal apparatus based on the acknowledgement information, to complete transmission to the first network apparatus or the first target terminal apparatus, so that the first network apparatus completes resource configuration of an entire cooperation process.

In a possible design, the first uplink data from the second terminal apparatus is received on the first uplink resource; and the second uplink data from the third terminal apparatus is received on the second uplink resource.

According to this embodiment of this application, the second terminal apparatus and the third terminal apparatus send, to the first terminal apparatus, sidelink data received from the first terminal apparatus, to complete transmission in a second phase of the cooperation process, thereby implementing transmission cooperation for the first terminal apparatus.

According to a third aspect, a communication apparatus is provided. For beneficial effects, refer to the descriptions of the first aspect. Details are not described herein again. The communication apparatus is a first terminal apparatus, is a chip or a module in the first terminal apparatus, or is a chip or a system on chip. The apparatus includes: a transceiver unit, configured to receive at least two pieces of downlink control information from a first network apparatus in a first slot, where the at least two pieces of downlink control information include first downlink control information and second downlink control information, the first downlink control information is used to indicate to send first sidelink information to a second terminal apparatus on a first sidelink resource, the second downlink control information is used to indicate to send second sidelink information to a third terminal apparatus on a second sidelink resource, and the at least two pieces of downlink control information are further used to determine a sequence of transport blocks included in the first sidelink information and a sequence of transport blocks included in the second sidelink information. The transceiver unit is further configured to send the first sidelink information to the second terminal apparatus on the first sidelink resource. The transceiver unit is further configured to send the second sidelink information to the second terminal apparatus on the second sidelink resource.

In a possible design, that the at least two pieces of downlink control information are further used to determine a sequence of transport blocks included in the first sidelink information and a sequence of transport blocks included in the second sidelink information includes: the first downlink control information and the second downlink control information are carried in a first control resource set CORESET and a second control resource set CORESET respectively; and sidelink information indicated by control information carried in the first control resource set includes a former data block, and sidelink information indicated by control information carried in the second control resource set includes a latter data block; or sidelink information indicated by control information carried in the first control resource set includes a latter data block, and sidelink information indicated by control information carried in the second control resource set includes a former data block.

In a possible design, that the at least two pieces of downlink control information are further used to determine a sequence of transport blocks included in the first sidelink information and a sequence of transport blocks included in the second sidelink information includes: the first downlink control information is scrambled by using a first radio temporary identifier, and the second downlink control information is scrambled by using a second radio temporary identifier; and the first radio temporary identifier indicates that the first sidelink information indicated by the first downlink control information includes a former data block, and the second radio temporary identifier indicates that the second sidelink information indicated by the second downlink control information includes a latter data block; or the first radio temporary identifier indicates that the first sidelink information indicated by the first downlink control information includes a latter data block, and the second radio temporary identifier indicates that the second sidelink information indicated by the second downlink control information includes a former data block.

In a possible design, that the at least two pieces of downlink control information are further used to determine a sequence of transport blocks included in the first sidelink information and a sequence of transport blocks included in the second sidelink information includes: the first downlink control information includes first indication information, and the second downlink control information includes second indication information; and the first indication information indicates that the first sidelink information indicated by the first downlink control information includes a former data block, and the second indication information indicates that the second sidelink information indicated by the second downlink control information includes a latter data block; or the first indication information indicates that the first sidelink information indicated by the first downlink control information includes a latter data block, and the second indication information indicates that the second sidelink information indicated by the second downlink control information includes a former data block.

In a possible design, the former data block is TB 0, and the latter data block is TB 1.

In a possible design, a time domain resource for the first sidelink resource is the same as a time domain resource for the second sidelink resource, and a frequency domain resource for the first sidelink resource does not overlap a frequency domain resource for the second sidelink resource; a time domain resource for the first sidelink resource does not overlap a time domain resource for the second sidelink resource; or a time domain resource for the first sidelink resource is the same as a time domain resource for the second sidelink resource, a frequency domain resource for the first sidelink resource is the same as a frequency domain resource for the second sidelink resource, and an antenna port used to transmit the first sidelink information on the first sidelink resource is different from an antenna port used to transmit the second sidelink information on the second sidelink resource.

In a possible design, the transceiver unit is further configured to send the first sidelink information and the second sidelink information in the first slot; or the transceiver unit is further configured to send the first sidelink information and the second sidelink information in a second slot, where the second slot and the first slot are different slots.

In a possible design, the transceiver unit is further configured to send a buffer status report to the first network apparatus, where the buffer status report is used to determine the first downlink control information and the second downlink control information, and the buffer status report is used to indicate a data volume of transport blocks included in the first sidelink information and a data volume of transport blocks included in the second sidelink information.

According to a fourth aspect, a communication apparatus is provided. For beneficial effects, refer to the descriptions of the second aspect. Details are not described herein again. The communication apparatus is a first network apparatus, or is a chip or a module in the first network apparatus, or is a chip or a system on chip. The apparatus includes: a processing unit, configured to determine at least two pieces of downlink control information, where the at least two pieces of downlink control information include first downlink control information and second downlink control information, the first downlink control information is used to indicate a first terminal apparatus to send first sidelink information to a second terminal apparatus on a first sidelink resource, the second downlink control information is used to indicate the first terminal apparatus to send second sidelink information to a third terminal apparatus on a second sidelink resource, and the at least two pieces of downlink control information are further used to determine a sequence of transport blocks included in the first sidelink information and a sequence of transport blocks included in the second sidelink information; and a transceiver unit, configured to send the at least two pieces of downlink control information to the first terminal apparatus in a first slot.

In a possible design, that the at least two pieces of downlink control information are further used to determine a sequence of transport blocks included in the first sidelink information and a sequence of transport blocks included in the second sidelink information includes: the first downlink control information and the second downlink control information are carried in a first control resource set CORESET and a second control resource set CORESET respectively; and sidelink information indicated by control information carried in the first control resource set includes a former data block, and sidelink information indicated by control information carried in the second control resource set includes a latter data block; or sidelink information indicated by control information carried in the first control resource set includes a latter data block, and sidelink information indicated by control information carried in the second control resource set includes a former data block.

In a possible design, that the at least two pieces of downlink control information are further used to determine a sequence of transport blocks included in the first sidelink information and a sequence of transport blocks included in the second sidelink information includes: the first downlink control information is scrambled by using a first radio temporary identifier, and the second downlink control information is scrambled by using a second radio temporary identifier; and the first radio temporary identifier indicates that the first sidelink information indicated by the first downlink control information includes a former data block, and the second radio temporary identifier indicates that the second sidelink information indicated by the second downlink control information includes a latter data block; or the first radio temporary identifier indicates that the first sidelink information indicated by the first downlink control information includes a latter data block, and the second radio temporary identifier indicates that the second sidelink information indicated by the second downlink control information includes a former data block.

In a possible design, that the at least two pieces of downlink control information are further used to determine a sequence of transport blocks included in the first sidelink information and a sequence of transport blocks included in the second sidelink information includes: the first downlink control information includes first indication information, and the second downlink control information includes second indication information; and the first indication information indicates that the first sidelink information indicated by the first downlink control information includes a former data block, and the second indication information indicates that the second sidelink information indicated by the second downlink control information includes a latter data block; or the first indication information indicates that the first sidelink information indicated by the first downlink control information includes a latter data block, and the second indication information indicates that the second sidelink information indicated by the second downlink control information includes a former data block.

In a possible design, the former data block is TB 0, and the latter data block is TB 1.

In a possible design, a time domain resource for the first sidelink resource is the same as a time domain resource for the second sidelink resource, and a frequency domain resource for the first sidelink resource does not overlap a frequency domain resource for the second sidelink resource; a time domain resource for the first sidelink resource does not overlap a time domain resource for the second sidelink resource; or a time domain resource for the first sidelink resource is the same as a time domain resource for the second sidelink resource, a frequency domain resource for the first sidelink resource is the same as a frequency domain resource for the second sidelink resource, and an antenna port used to transmit the first sidelink information on the first sidelink resource is different from an antenna port used to transmit the second sidelink information on the second sidelink resource.

In a possible design, the first sidelink information and the second sidelink information are sent in the first slot; or the first sidelink information and the second sidelink information are sent in a second slot, where the second slot and the first slot are different slots.

In a possible design, the transceiver unit is further configured to receive a buffer status report from the first terminal apparatus, where the buffer status report is used to determine the first downlink control information and the second downlink control information, and the buffer status report is used to indicate a data volume of transport blocks included in the first sidelink information and a data volume of transport blocks included in the second sidelink information.

In a possible design, the transceiver unit is further configured to receive first acknowledgement information from the second terminal apparatus, where the first acknowledgement information is used to indicate whether the second terminal apparatus successfully receives the first sidelink information; the processing unit is further configured to determine third downlink control information based on the first acknowledgement information; the transceiver unit is further configured to send the third downlink control information to the second terminal apparatus, where the third downlink control information is used to indicate a first uplink resource or a third sidelink resource, the first uplink resource is used to transmit first uplink data, and the third sidelink resource is used to transmit third sidelink data; the transceiver unit is further configured to receive second acknowledgement information from the third terminal apparatus, where the second acknowledgement information is used to indicate whether the third terminal apparatus successfully receives the second sidelink information; the processing unit is further configured to determine fourth downlink control information based on the second acknowledgement information; and the transceiver unit is further configured to send the fourth downlink control information to the third terminal apparatus, where the fourth downlink control information is used to indicate a second uplink resource or a fourth sidelink resource, the second uplink resource is used to transmit second uplink data, and the fourth sidelink resource is used to transmit fourth sidelink data. The first uplink data or the third sidelink data is determined based on a data block included in the first sidelink information, and the second uplink data or the fourth sidelink data is determined based on a data block included in the second sidelink information.

In a possible design, the transceiver unit is further configured to receive, on the first uplink resource, the first uplink data from the second terminal apparatus; and the transceiver unit is further configured to receive, on the second uplink resource, the second uplink data from the third terminal apparatus.

According to a fifth aspect, a data transmission method is provided. The method is performed by a second terminal apparatus. The second terminal apparatus is a module or a chip in the second terminal apparatus. The second terminal apparatus alternatively is a chip or a system on chip. The method includes: receiving first sidelink information from a first terminal apparatus, where the first sidelink information includes first sidelink control information and first sidelink data, the first sidelink control information is used to indicate a first transmission resource for transmitting the first sidelink data, the first sidelink control information is indicated by first downlink control information, the first downlink control information belongs to at least two pieces of downlink control information, the first downlink control information is used to indicate a first sidelink resource for transmitting the first sidelink control information and the first sidelink data, and the first sidelink resource includes the first transmission resource; receiving, on the first transmission resource, the first sidelink data from the first terminal apparatus; and sending first uplink data to the first network apparatus, where the first uplink data is determined based on the first sidelink data, or sending, by the second terminal apparatus, third sidelink data to a first target terminal apparatus, where the third sidelink data is determined based on the first sidelink data.

In this embodiment of this application, the second terminal apparatus receives the first sidelink information from the first terminal apparatus, where the first sidelink information includes the first sidelink control information and the first sidelink data, and the first sidelink control information further indicates a time-frequency resource for receiving the sidelink data. Therefore, the second terminal apparatus receives the sidelink data based on an indication of the control information, and forwards the sidelink data, to complete cooperation with the first terminal apparatus.

In a possible design, first acknowledgement information is sent to the first network apparatus, where the first acknowledgement information is used to indicate whether the second terminal apparatus successfully receives the first sidelink data; the second terminal apparatus receives third downlink control information from the first network apparatus, where the third downlink control information is used to indicate a first uplink resource, the first uplink resource is used to transmit the first uplink data, and the third downlink control information is determined based on the first acknowledgement information; and the sending first uplink data to the first network apparatus includes: sending the first uplink data to the first network apparatus on the first uplink resource.

According to this embodiment of this application, the second terminal apparatus forwards the data from the first terminal apparatus to the first network apparatus, to assist the first terminal apparatus in completing a transmission process of uplink cooperation, so that a transmission capability of the first terminal apparatus is improved with the help of a sending capability of the second terminal apparatus, and a data transmission range of the first terminal apparatus is expanded.

In a possible design, first acknowledgement information is sent to the first network apparatus, where the first acknowledgement information is used to indicate whether the second terminal apparatus successfully receives the first sidelink data; third downlink control information from the first network apparatus is received, where the third downlink control information is used to indicate a third sidelink resource, the third sidelink resource is used to transmit the third sidelink data, and the third downlink control information is determined based on the first acknowledgement information; and the sending third sidelink data to the first target terminal apparatus includes: sending the third sidelink data to the first target terminal apparatus on the third sidelink resource.

According to this embodiment of this application, the second terminal apparatus forwards the data from the first terminal apparatus to the first network apparatus, to assist the first terminal apparatus in completing a transmission process of sidelink cooperation, so that a data transmission range of the first terminal apparatus is expanded.

According to a sixth aspect, a communication apparatus is provided. For beneficial effects, refer to the descriptions of the fifth aspect. Details are not described herein again. The communication apparatus is a second terminal apparatus, or is a chip or a module in the second terminal apparatus, or is a chip or a system on chip. The apparatus includes: a transceiver unit, configured to receive first sidelink control information from a first terminal apparatus, where the first sidelink control information is used to indicate a first transmission resource for transmitting first sidelink data, the first sidelink control information is indicated by first downlink control information, the first downlink control information belongs to at least two pieces of downlink control information, the first downlink control information is used to indicate a first sidelink resource for transmitting the first sidelink control information and the first sidelink data, and the first sidelink resource includes the first transmission resource. The transceiver unit is further configured to receive, on the first transmission resource, the first sidelink data from the first terminal apparatus. The transceiver unit is further configured to send first uplink data to a first network apparatus, where the first uplink data is determined based on the first sidelink data. Alternatively, the transceiver unit is further configured to send third sidelink data to a first target terminal apparatus, where the third sidelink data is determined based on the first sidelink data.

In a possible design, the transceiver unit is further configured to send first acknowledgement information to the first network apparatus, where the first acknowledgement information is used to indicate whether the second terminal apparatus successfully receives the first sidelink data; the transceiver unit is further configured to receive third downlink control information from the first network apparatus, where the third downlink control information is used to indicate a first uplink resource, the first uplink resource is used to transmit the first uplink data, and the third downlink control information is determined based on the first acknowledgement information; and that the transceiver unit is further configured to send the first uplink data to the first network apparatus includes: the transceiver unit is further configured to send the first uplink data to the first network apparatus on the first uplink resource.

In a possible design, the transceiver unit is further configured to send first acknowledgement information to the first network apparatus, where the first acknowledgement information is used to indicate whether the second terminal apparatus successfully receives the first sidelink data; the transceiver unit is further configured to receive third downlink control information from the first network apparatus, where the third downlink control information is used to indicate a third sidelink resource, the third sidelink resource is used to transmit the third sidelink data, and the third downlink control information is determined based on the first acknowledgement information; and that the transceiver unit is further configured to send the third sidelink data to the first target terminal apparatus includes: the transceiver unit is further configured to send the third sidelink data to the first target terminal apparatus on the third sidelink resource.

According to a seventh aspect, an embodiment of this application provides a computer-readable storage medium or a non-volatile storage medium. The computer-readable storage medium or the non-volatile storage medium stores instructions or a program. When the instructions or the program is run on a computer, the computer is enabled to perform the methods in the foregoing aspects, or when the instructions or the program is run on one or more processors, a communication apparatus including the one or more processors is enabled to perform the methods in the foregoing aspects.

According to an eighth aspect, an embodiment of this application provides a computer program product. The computer program product is configured to store a computer program; and when the computer program is run on a computer, the computer is enabled to perform the method according to any one of the foregoing aspects.

According to a ninth aspect, an embodiment of this application provides a chip or an indication information transmission apparatus, including at least one processor. The at least one processor is coupled to a memory, the memory includes instructions, and the at least one processor runs the instructions to enable the common signal transmission apparatus to perform the method in the first aspect, the second aspect, or the fifth aspect.

According to a tenth aspect, a communication apparatus is provided. The communication apparatus includes one or more processors, and one or more memories or non-volatile storage media. The one or more memories or non-volatile storage media store instructions or programs. When the one or more processors execute the instructions or the programs, the communication apparatus or the one or more processors are enabled to perform the methods in the foregoing aspects and the embodiments of this application.

According to an eleventh aspect, a terminal apparatus or a communication apparatus is provided. The terminal apparatus or the communication apparatus is configured to perform the method in the first aspect or the third aspect.

According to a twelfth aspect, a network apparatus or a communication apparatus is provided. The network apparatus or the communication apparatus is configured to perform the method in the second aspect.

According to a thirteenth aspect, an embodiment of this application provides a system. The system includes the communication apparatus in the third aspect and the communication apparatus in the fourth aspect.

DESCRIPTION OF EMBODIMENTS

Figure 1:
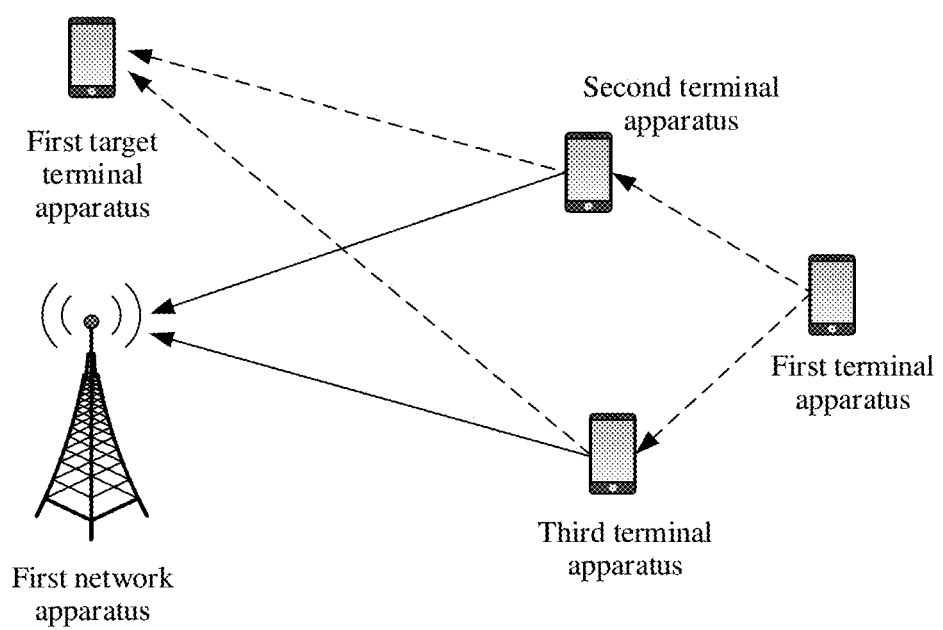
FIG. 1 is a schematic architectural diagram of a system according to an embodiment of this application.

FIG. 1 is a schematic diagram of a possible application scenario according to an embodiment of this application. As shown in FIG. 1, the application scenario includes a plurality of terminal apparatuses and network apparatuses. As shown in FIG. 1, a first terminal apparatus, a second terminal apparatus, and a third terminal apparatus form a user equipment cooperation group. In a first phase of transmission, the first terminal apparatus sends data to the second terminal apparatus and the third terminal apparatus over sidelinks. In a second phase of transmission, the second terminal apparatus and the third terminal apparatus forward the received data to the first network apparatus. There are a plurality of forwarding manners, for example, amplification forwarding, decoding forwarding, and compression forwarding. In addition to forwarding the data to the first network apparatus, the second terminal apparatus and the third terminal apparatus further forwards the data from the first terminal apparatus to another terminal apparatus, for example, to a first target terminal apparatus. The first terminal apparatus is referred to as a source terminal apparatus or a source user equipment (Source User Equipment, SUE). The second terminal apparatus and the third terminal apparatus is referred to as cooperation terminal apparatuses or cooperation user equipment (Cooperation User Equipment, CUEs). The first target terminal apparatus is referred to as a target user equipment (Target User Equipment, TUE). In this embodiment of this application recorded in FIG. 1, one source terminal apparatus, two cooperation terminal apparatuses, and one target terminal apparatus are provided as examples. In an actual scenario, there is a plurality of serving terminal apparatuses, a plurality of cooperation terminal apparatuses, and a plurality of target terminal apparatuses. Through the two phases of transmission, the first terminal apparatus sends the data to the first network apparatus or the first target terminal apparatus in cooperation with the second terminal apparatus and the third terminal apparatus, to complete a cooperation transmission or relay transmission process between the terminal apparatuses. The embodiments of this application are applicable to UE cooperation (UE Cooperation), but further applicable to other application scenarios such as user equipment relay (UE relay), sidelink relay (Sidelink Relay), or internet of vehicles.

The following describes some terms in embodiments of this application to facilitate understanding of a person skilled in the art.

(1) Terminal apparatus: The first terminal apparatus, the second terminal apparatus, the third terminal apparatus, a fourth terminal apparatus, and the first target terminal apparatus in this application includes various devices having a wireless communication function, or units, components, modules, apparatuses, chips, or SoCs in the devices. The device having a wireless communication function is, for example, a vehicle-mounted device, a wearable device, a computing device, or another device connected to a wireless modem, a mobile station (Mobile station, MS), a terminal (terminal), or a user equipment (User Equipment, UE). When the first terminal apparatus to the fourth terminal apparatus and the first target terminal apparatus are vehicle-mounted devices, the first terminal apparatus to the fourth terminal apparatus and the first target terminal apparatus is placed or installed in a vehicle. The vehicle-mounted device is considered as a part of the vehicle, or is considered as a module or a module disposed in the vehicle. The vehicle-mounted terminal apparatus further is referred to as an on board unit (On Board Unit, OBU).

The first terminal apparatus to the fourth terminal apparatus and the first target terminal apparatus in the embodiments of this application further includes devices that provide a voice and/or data connectivity for a user, and include a device that provides a voice for the user, or include a device that provides data connectivity for the user, or include a device that provides a voice and data connectivity for the user. For example, the terminal device includes a handheld device having a wireless connection function or a processing device connected to a wireless modem. The terminal device communicates with a core network through a radio access network (radio access network, RAN), and exchange a voice or data with the RAN, or exchange a voice and data with the RAN. The terminal apparatus includes a user equipment (user equipment, UE), a wireless terminal device, a mobile terminal device, a device-to-device (device-to-device, D2D) communication terminal device, a vehicle-to-everything (vehicle-to-everything, V2X) terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device includes a mobile phone (or referred to as a "cellular" phone), a computer with a mobile terminal device, or a portable, pocket-sized, hand-held, or computer built-in mobile apparatus. For example, the terminal device is a device such as a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device having relatively low power consumption, a device having a limited storage capability, or a device having a limited computing capability. For example, the terminal device includes an information sensing device such as a barcode, radio frequency identification (radio frequency identification, RFID), a sensor, a global positioning system (global positioning system, GPS), or a laser scanner.

By way of example rather than limitation, the first terminal apparatus to the fourth terminal apparatus and the first target terminal apparatus in the embodiments of this application alternatively is wearable devices. The wearable device further is referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that is directly worn by a user or integrated into clothes or an accessory of the user. The wearable device is a hardware device, but further implements a powerful function through software support, data exchange, and cloud interaction. In a broad sense, wearable intelligent devices include full-featured and large-sized devices that implements complete or partial functions without depending on smartphones, such as smart watches or smart glasses, and devices that focus on one type of application function and works with other devices such as smartphones, for example, various smart bands or smart jewelry for monitoring physical signs.

The terminal apparatus is a terminal device, or is a module configured to implement a function of the terminal device. The module is disposed in the terminal device, or is disposed independently of the terminal device. For example, the module is a chip, a chip system, or a system on chip.

The source terminal apparatus is a terminal apparatus that has an uplink data transmission condition or a sidelink data transmission condition, and the source terminal apparatus is configured to use a cooperation terminal apparatus to assist in transmission. The source terminal apparatus sends to-be-transmitted data to another terminal apparatus in the user group, for example, a cooperation terminal apparatus, and the cooperation terminal apparatus forwards the data.

The cooperation terminal apparatus is a terminal apparatus that assists another terminal apparatus in transmitting data. The cooperation terminal apparatus receives data from the source terminal apparatus, and forwards the data to a target identified by the source terminal apparatus, for example, a target terminal apparatus or a base station.

The target terminal apparatus is a terminal apparatus to which the source terminal apparatus finally transmits data or information by using the cooperation terminal apparatus in a user equipment cooperation process, and is a destination to which the source terminal apparatus intends to send the data.

(2) Network apparatus: The network apparatus includes, for example, an access network (access network, AN) device such as the first network apparatus (for example, an access point), and is a device that communicates with a wireless terminal device through an air interface by using one or more cells in an access network. Alternatively, the network device is, for example, a road side unit (road side unit, RSU) in a vehicle-to-everything (vehicle-to-everything, V2X) technology. The first network apparatus is configured to mutually convert a received over-the-air frame and an IP packet and serve as a router between the terminal device and a rest part of the access network. The rest part of the access network includes an IP network. The RSU is a fixed infrastructure entity supporting a V2X application, and exchanges a message with another entity supporting the V2X application. The network device further coordinates attribute management of the air interface. For example, the network apparatus includes an evolved first network apparatus (NodeB or eNB or eNodeB, NodeB, evolved NodeB) in a long term evolution (long term evolution, LTE) system or a long term evolution-advanced (long term evolution-advanced, LTE-A) system, includes a next generation NodeB (next generation NodeB, gNB) in a $5^{th}$ generation ($5^{th}$ generation, 5G) new radio (new radio, NR) system (further briefly referred to as an NR system), or includes a centralized unit (centralized unit, CU) and a distributed unit (distributed unit, DU) in a cloud radio access network (cloud radio access network, Cloud RAN) system. This is not limited in the embodiments of this application.

(4) Sidelink (sidelink): The sidelink is a link between terminal apparatuses. An uplink is a link over which the terminal apparatus sends information to the network apparatus, and a downlink is a link over which the terminal apparatus receives information from the network apparatus.

(5) Terms "system" and "network" is used interchangeably in embodiments of this application. In addition, "at least one" means one or more, and "a plurality of" means two or more. A term "and/or" describes an association relationship between associated objects and represents those three relationships exist. For example, A and/or B represents the following three cases: A exists, both A and B exist, and B exists, where A and B is singular or plural. The character "/" represents an "or" relationship between the associated objects. "At least one of the following" or a similar expression thereof indicates any combination of the following and includes any combination of one or more of the following. For example, at least one of a, b, or c indicates: a, b, c, a-b, a-c, b-c, or a-b-c, where a, b, and c is singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first power control factor and a second power control factor are used to distinguish between different power control factors, and do not necessarily indicate different content, priorities, importance degrees, or the like of the two power control factors.

With reference to examples, the following describes the embodiments of this application in a more detailed way by using the first terminal apparatus, the second terminal apparatus, the third terminal apparatus, the fourth terminal apparatus, the first target terminal apparatus, and the first network apparatus as examples.

Figure 2:
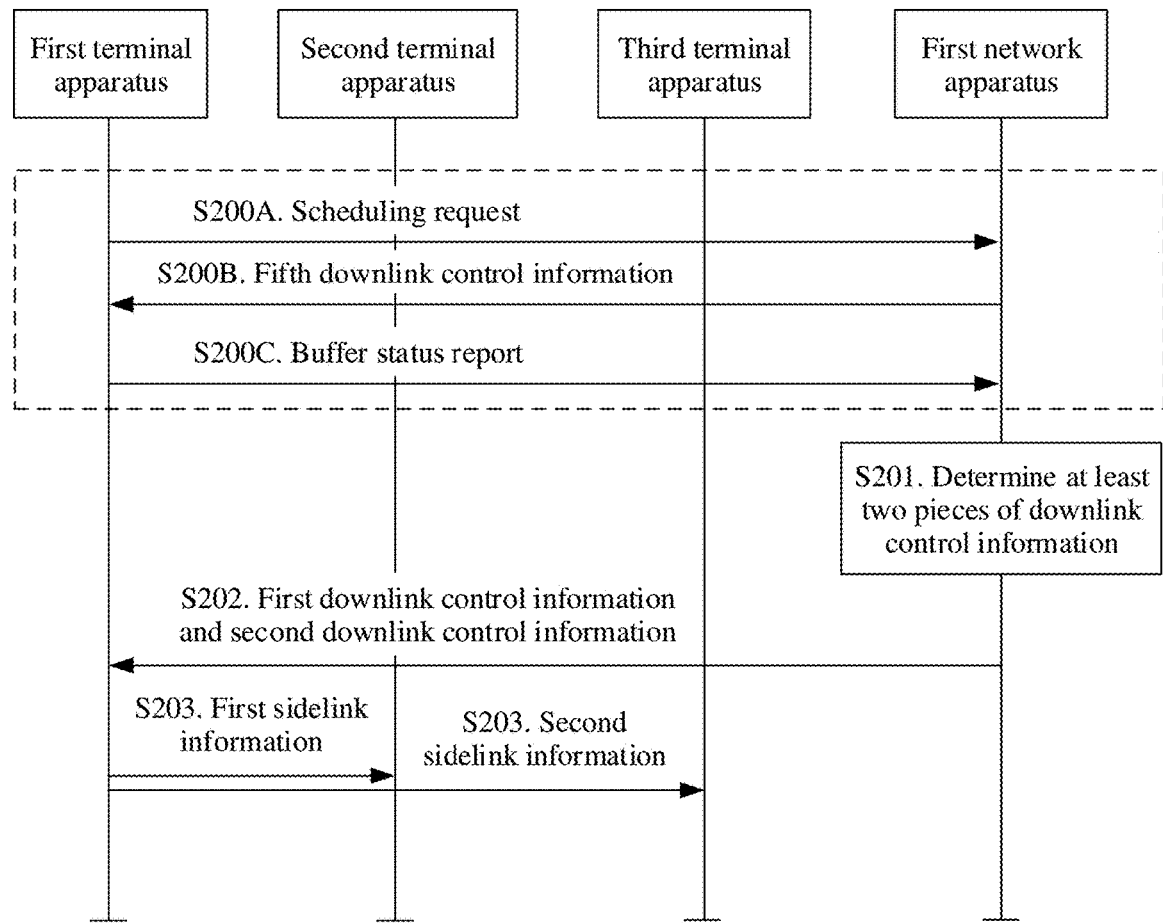
FIG. 2 shows a data transmission method, a first terminal apparatus, a second terminal apparatus, a third terminal apparatus, a first network apparatus, and a system according to an embodiment of this application.

FIG. 2 shows a data transmission method, a first terminal apparatus, a second terminal apparatus, a third terminal apparatus, and a first network apparatus that perform the data transmission method, and a system including the first terminal apparatus, the second terminal apparatus, the third terminal apparatus, and the first network apparatus according to an embodiment of this application.

Figure 15:
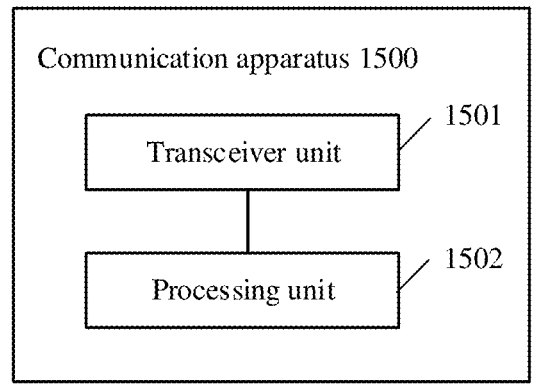
FIG. 15 shows a first terminal apparatus according to an embodiment of this application.
Figure 16:
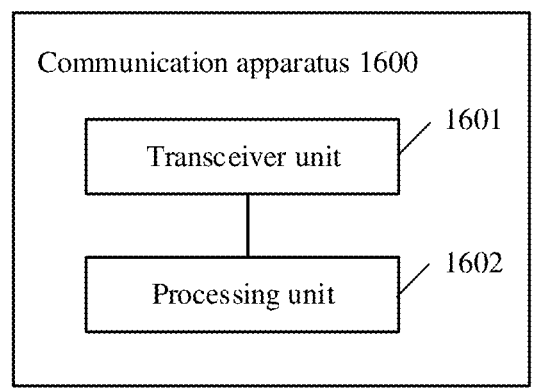
FIG. 16 shows a second terminal apparatus according to an embodiment of this application.
Figure 17:
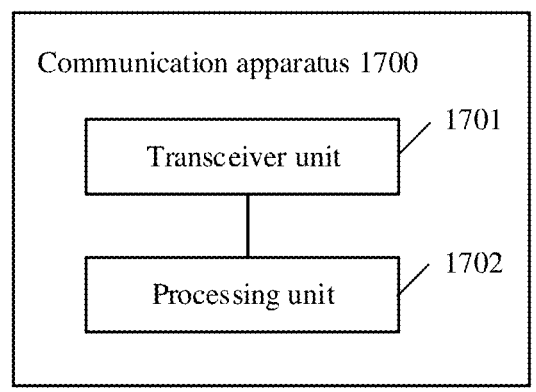
FIG. 17 shows a third terminal apparatus according to an embodiment of this application.
Figure 18:
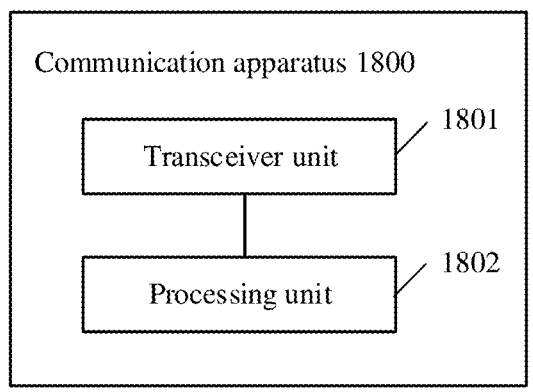
FIG. 18 shows a first network apparatus according to an embodiment of this application.
Figure 19:
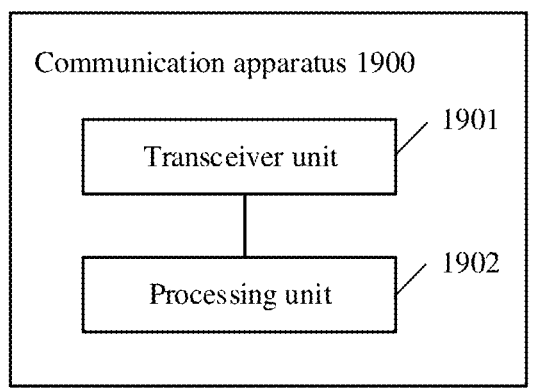
FIG. 19 shows a first target terminal apparatus according to an embodiment of this application.

As shown in FIG. 15, the first terminal apparatus includes a transceiver unit 1501 and a processing unit 1502. As shown in FIG. 16, the second terminal apparatus includes a transceiver unit 1601 and a processing unit 1602. As shown in FIG. 17, the third terminal apparatus includes a transceiver unit 1701 and a processing unit 1702. As shown in FIG. 18, the first network apparatus includes a transceiver unit 1801 and a processing unit 1802. As shown in FIG. 19, the first target terminal apparatus includes a transceiver unit 1901 and a processing unit 1902. A fourth terminal apparatus has a same structure and function as the third terminal apparatus, and further includes a transceiver unit and a processing unit.

When the first, second, or third terminal apparatus is a terminal device or a user equipment, and the first network apparatus is a network apparatus or a network device, the transceiver unit 1501, the transceiver unit 1601, the transceiver unit 1701, and the transceiver unit 1801 is sending units or transmitters when sending information, and the transceiver unit 1501, the transceiver unit 1601, the transceiver unit 1701, and the transceiver unit 1801 is receiving units or receivers when receiving information. The transceiver unit is a transceiver, and the transceiver, the transmitter, or the receiver is a radio frequency circuit. When the first, second, or third terminal apparatus includes a storage unit, the storage unit is configured to store computer instructions. A processor is in communication connection with a memory, and the processor executes the computer instructions stored in the memory, to enable the first terminal apparatus, the second terminal apparatus, the third terminal apparatus, and the first network apparatus to perform the method in the embodiment of FIG. 2. The processor is a general-purpose central processing unit (CPU), a microprocessor, or an application-specific integrated circuit (Application-Specific Integrated Circuit, ASIC).

When the first, second, or third terminal apparatus or the first network device is a chip, the transceiver unit 1501, the transceiver unit 1601, the transceiver unit 1701, and the transceiver unit 1801 is input and/or output interfaces, pins, circuits, or the like. The processing unit executes computer-executable instructions stored in the storage unit, to enable the chip in the first terminal apparatus, the second terminal apparatus, the third terminal apparatus, or the first network apparatus to perform the method in FIG. 2. Optionally, the storage unit is a storage unit in the chip, for example, a register or a buffer, or the storage unit is a storage unit in the terminal but outside the chip, for example, a read-only memory (Read-Only Memory, ROM), another type of static storage device capable of storing static information and instructions, or a random access memory (Random Access Memory, RAM).

FIG. 2 is a flowchart of a method according to Embodiment 1 of this application. Steps related to a data transmission method are as follows:

Step S201. A processing unit 1802 of a first network apparatus determines at least two pieces of downlink control information (Downlink Control Information, DCI), where the at least two pieces of downlink control information include first downlink control information and second downlink control information, the first downlink control information is used to indicate to send first sidelink information to a second terminal apparatus on a first sidelink resource, and the second downlink control information is used to indicate to send second sidelink information to a third terminal apparatus on a second sidelink resource.

Optionally, the first sidelink information includes first sidelink control information and first sidelink data, and the second sidelink information includes second sidelink control information and second sidelink data. A sidelink resource includes at least a sidelink control information transmission resource and a sidelink data transmission resource, for example, a physical sidelink control channel (Physical Sidelink Control Channel, PSCCH) used to transmit sidelink control information and a physical sidelink shared channel (Physical Sidelink Shared Channel, PSSCH) used to transmit sidelink data. The sidelink resource is used by a first terminal apparatus to communicate with a cooperation terminal apparatus such as the second terminal apparatus or the third terminal apparatus on a resource. The first sidelink resource is used to send the first sidelink information. The first sidelink resource includes both the PSCCH resource used to send the first sidelink control information and the PSSCH resource used to send the first sidelink data.

Optionally, the first network apparatus preconfigures a series of sidelink communication resource pools, for example, a PSCCH resource pool and a PSSCH resource pool, used for sidelink transmission between the first terminal apparatus and the second terminal apparatus. The resource pool includes time domain resources and frequency domain resources, and the time domain resources are periodically configured. The first sidelink resource that is in the first downlink control information and that is used to indicate the first terminal apparatus to send the first sidelink control information and the first sidelink data to the second terminal apparatus is selected by the first network apparatus from the PSCCH resource pool and the PSSCH resource pool. For example, a PSCCH resource and a PSSCH resource are selected based on time, a transmission service type, or a volume of data transmitted by the first terminal apparatus over sidelinks, and are indicated to the first terminal apparatus by using the first downlink control information. Similarly, the first network apparatus alternatively preconfigures a PSCCH resource pool and a PSSCH resource pool that are used for sidelink transmission between the first terminal apparatus and the third terminal apparatus. When the first terminal apparatus sends sidelink control information and sidelink data to the third terminal apparatus, the first network apparatus uses a PSCCH resource and a PSSCH resource selected from the resource pools for communication between the first terminal apparatus and the third terminal apparatus, and notifies the first terminal apparatus of information about the PSCCH resource and the PSSCH resource by using the second downlink control information.

Optionally, before step S201, step S200 further exists. In another embodiment of this application, step S200 or some steps of step S200 further exists. For example, in flowchart 10 corresponding to Embodiment 2 of this application, before step S301, steps S200A and S200B exists. Step S200 includes the following steps:

S200A. When the first terminal apparatus has an uplink data transmission condition, a transceiver unit 1501 of the first terminal apparatus sends a scheduling request (Scheduling request, SR) to the first network apparatus, where the scheduling request is used to notify the first network apparatus that the first terminal apparatus has a data transmission condition and the first network apparatus further configures a transmission resource. The scheduling request is further used to trigger the first network apparatus to send downlink control information to the first terminal apparatus.

S200B. After receiving the scheduling request, a transceiver unit 1801 of the first network apparatus sends fifth downlink control information to the first terminal apparatus, where the fifth downlink control information carries uplink scheduling information, the uplink scheduling information is used to indicate a time-frequency resource used by the first terminal apparatus to send a buffer status report to the first network apparatus, and after receiving the uplink scheduling information, the first terminal apparatus determines a resource on which the buffer status report is to be sent.

S200C. The transceiver unit 1501 of the first terminal apparatus sends the buffer status report (Buffer Status Report, BSR) to the first network apparatus based on the uplink scheduling information, and the transceiver unit 1801 of the first network apparatus receives the buffer status report from the first terminal apparatus. The buffer status report is used to indicate a data volume of the first sidelink data and a data volume of the second sidelink data. The buffer status report alternatively is used to indicate a total volume of data to be sent by the first terminal apparatus to the first network apparatus. The first network apparatus determines the at least two pieces of downlink control information based on at least one of the following information: the scheduling request from the first terminal apparatus, the buffer status report from the first terminal apparatus, a condition of a channel between the first terminal apparatus and the second terminal apparatus, a condition of a channel between the first terminal apparatus and the third terminal apparatus, a condition of a channel between the first terminal apparatus and the first network apparatus, a condition of a channel between the second terminal apparatus and the first network apparatus, and a condition of a channel between the third terminal apparatus and the first network apparatus.

For example, the first terminal apparatus transmits 1000 bit data to the first network apparatus. The first terminal apparatus sends a scheduling request to the first network apparatus, and receives downlink control information sent by the first network apparatus. The first terminal apparatus sends a buffer status report BSR to the first network apparatus based on uplink scheduling information in the downlink control information. The first network apparatus knows an uploading condition of the 1000 bit data of the first terminal apparatus after receiving the buffer status report of the first terminal apparatus. The first network apparatus searches idle terminal apparatuses near an area in which the first terminal apparatus is located, measures a condition of a channel between each idle terminal apparatus and the first terminal apparatus and a condition of a channel between each idle terminal apparatus and the first network apparatus, and determines that the second terminal apparatus and the third terminal apparatus is used as cooperation terminal apparatuses of the first terminal apparatus. A condition of a channel between the second terminal apparatus or the third terminal apparatus and the first terminal apparatus is good, and a condition of a channel between the second terminal apparatus or the third terminal apparatus and the first network apparatus is good, so that a data transmission basis exists. The second terminal apparatus and the third terminal apparatus is assisting terminal apparatuses selected by the first network apparatus from a determined assistance group. The assistance group already includes several terminal apparatuses, and when the first terminal apparatus has a data transmission condition, the first network apparatus determines, from the several terminal apparatuses, terminal apparatuses (for example, the second terminal apparatus and the third terminal apparatus) that assists the first terminal apparatus in transmitting information to the first network apparatus. Alternatively, the second terminal apparatus and the third terminal apparatus is unable to be in the same assistance group as the first terminal apparatus. When the first terminal apparatus has a data transmission condition, the first network apparatus dynamically determines, for example through measurement, terminal apparatuses (for example, the second terminal apparatus and the third terminal apparatus) that assists the first terminal apparatus in transmitting information to the first network apparatus. In this case, the first network apparatus determines that the first to fourth terminal apparatuses and the first target terminal apparatus belong to the same assistance group. The assistance group further is referred to as a cooperation group. The first network apparatus determines the data volumes of the first sidelink data and the second sidelink data based on the buffer status report, each channel condition, and a capability of each terminal apparatus. For example, the data volumes are respectively 10 bits and 20 bits. The second terminal apparatus forwards 10 bit information to the first network apparatus for the first terminal apparatus, and the third terminal apparatus forwards 20 bit information to the first network apparatus for the first terminal apparatus.

In this embodiment of this application, terminal devices, for example, the first terminal apparatus and the second terminal apparatus, configured to assist another terminal apparatus in communicating with a network apparatus is referred to as cooperation terminal apparatuses, or is referred to as auxiliary user equipment, relay terminal devices, cooperation user equipment (cooperation user equipment, CUEs), neighboring user equipment (Neighboring User Equipment, NUEs), or the like.

Step S202. The transceiver unit 1801 of the first network apparatus sends the at least two pieces of downlink control information to the first terminal apparatus in a first slot, and the transceiver unit 1501 of the first terminal apparatus receives the at least two pieces of downlink control information from the first network apparatus in the first slot, where the at least two pieces of downlink control information include the first downlink control information and the second downlink control information, the first downlink control information is used to indicate to send the first sidelink information to the second terminal apparatus on the first sidelink resource, the second downlink control information is used to indicate to send the second sidelink information to the third terminal apparatus on the second sidelink resource, and the at least two pieces of downlink control information are further used to determine a sequence of transport blocks included in the first sidelink information and a sequence of transport blocks included in the second sidelink information.

Optionally, in any embodiment of this application, the first sidelink information includes the first sidelink control information and/or the first sidelink data, and the second sidelink information includes the second sidelink control information and/or the second sidelink data. Optionally, the first sidelink information and the second sidelink information is same sidelink information; the first sidelink information and the second sidelink information is different sidelink information; or the first sidelink information and the second sidelink information is a first part and a second part of sidelink information, that is, the first sidelink information and the second sidelink information form the sidelink information.

Optionally, the first slot is one slot (slot), and includes 14 symbols. Alternatively, the first slot is another time unit, for example, a mini slot (mini slot), a subframe, or a resource configuration unit, or is several orthogonal frequency division multiplexing (Orthogonal Frequency Division Multiplexing, OFDM) symbols. The first network apparatus sends a plurality of pieces of downlink control information to the first terminal apparatus in a same slot. Compared with a manner in which the first network apparatus sequentially sends pieces of downlink control information in a plurality of slots, this method reduces a control information delivery delay and improves cooperation transmission efficiency. Optionally, the transceiver unit 1801 of the first network apparatus sends the at least two pieces of downlink control information to the first terminal apparatus at a same moment, and the transceiver unit 1501 of the first terminal apparatus receives the at least two pieces of downlink control information from the first network apparatus further at a same moment. Duration of one radio frame is 10 ms, and each radio frame includes 10 subframes. Therefore, a length of each subframe is 1 ms. As shown in Table 1, duration of a slot is related to a subcarrier spacing. One radio frame has 10 subframes, one subframe has k slots, and one slot has 14 symbols. A quantity of slots in each subframe depends on a parameter $\mu$, and $\mu$ has five values: 0, 1, 2, 3, and 4.

TABLE 1

| Value of $\mu$ | Subcarrier spacing $2^n \times 15$ kHz | k slots/subframes | Duration of each slot (ms) |
| --- | --- | --- | --- |
| 0 | 15 | 1 | 1 |
| 1 | 30 | 2 | 0.5 |
| 2 | 60 | 4 | 0.25 |
| 3 | 120 | 8 | 0.125 |
| 4 | 240 | 16 | 0.0625 |

The first downlink control information is used as an example to describe information included in downlink control information. In addition to information about the first sidelink resource, the first downlink control information further includes or be used to indicate at least one of the following information: a target terminal index ID of sidelink transmission, a modulation and coding scheme MCS of sidelink transmission of the first sidelink data, a data volume of the first sidelink data, new data indication information of the first sidelink data, a HARQ process number of the first sidelink data, sidelink transmit power control information of the first sidelink data, and a precoding matrix of the first sidelink data. Similarly, other downlink control information in the at least two pieces of downlink control information further includes at least one of the foregoing information.

A target user index ID of sidelink transmission is preconfigured by using higher layer signaling or a protocol, and is used by the first terminal apparatus to determine a target terminal index ID of sidelink communication. For example, a target terminal index ID in downlink control information is 3, indicating that the downlink control information is used to configure a process of communication between the first terminal apparatus and the third terminal apparatus.

A sidelink resource includes at least a sidelink control information transmission resource and a sidelink data transmission resource, for example, a physical sidelink control channel PSCCH resource used to transmit sidelink control information and a physical sidelink shared channel PSSCH resource used to transmit sidelink data. The sidelink resource is used by the first terminal apparatus to communicate with a cooperation terminal apparatus such as the second terminal apparatus or the third terminal apparatus on a resource.

The modulation and coding scheme MCS of sidelink transmission of the first sidelink data is a modulation and coding scheme that is of the first sidelink data and that is determined by the first network apparatus based on a factor such as a sidelink channel condition. The new data indication information of the first sidelink data is used to indicate whether the first sidelink data sent by the first terminal apparatus to the second terminal apparatus is new data or retransmitted data. The sidelink transmit power control information of the first sidelink data is used to indicate a power used by the first terminal apparatus to transmit data over a sidelink.

The at least two pieces of downlink control information further includes other downlink control information corresponding to the fourth terminal apparatus, a fifth terminal apparatus, and a sixth terminal apparatus, and the downlink control information includes at least one type of information included in the first downlink control information.

Step S203. The transceiver unit 1501 of the first terminal apparatus sends the first sidelink information to the second terminal apparatus on the first sidelink resource based on the first downlink control information, where the first sidelink information includes the first sidelink control information and the first sidelink data; a transceiver unit 1601 of the second terminal apparatus receives the first sidelink control information and the first sidelink data from the first terminal apparatus, where the first sidelink control information is used to indicate a first transmission resource used to transmit the first sidelink data, and the first sidelink resource includes the first transmission resource; the transceiver unit 1501 of the first terminal apparatus sends the second sidelink information to the third terminal apparatus on the second sidelink resource based on the second downlink control information, where the second sidelink information includes the second sidelink control information and the second sidelink data; and a transceiver unit 1601 of the third terminal apparatus receives the second sidelink control information and the second sidelink data from the first terminal apparatus, where the second sidelink control information is used to indicate a second transmission resource used to transmit the second sidelink data, the second sidelink resource includes the second transmission resource, and the at least two pieces of downlink control information are further used to determine the sequence of a transport block included in the first sidelink information and a transport block included in the second sidelink information.

Optionally, the first network apparatus preconfigures a PSCCH resource pool for the second terminal apparatus by using higher layer information. The PSCCH resource pool includes time domain resources and frequency domain resources. The time domain resources are periodic. A resource used by the first terminal apparatus to send the first sidelink control information to the second terminal apparatus is a resource in the PSCCH resource pool. After receiving the preconfigured information, the second terminal apparatus performs blind detection on a corresponding PSCCH resource pool, for example, periodically performs blind detection. If information transmitted on a PSCCH includes a user identifier ID corresponding to the second terminal apparatus is detected, sidelink control information on the PSCCH resource is received, a transmission resource of sidelink data indicated in the sidelink control information is determined, and the sidelink data is received on the transmission resource of the sidelink data.

Similarly, the first network apparatus further preconfigures a PSCCH resource pool for the third terminal apparatus by using higher layer information. The PSCCH resource pool includes time domain resources and frequency domain resources. The time domain resources are periodic. A resource used by the first terminal apparatus to send the second sidelink control information to the third terminal apparatus is a resource in the PSCCH resource pool. After receiving the preconfigured information, the third terminal apparatus performs blind detection on a corresponding PSCCH resource pool, for example, periodically performs blind detection. If information transmitted on a PSCCH includes a user identifier ID corresponding to the third terminal apparatus is detected, sidelink control information on the PSCCH resource is received, a transmission resource of sidelink data indicated in the sidelink control information is determined, and the sidelink data is received on the transmission resource of the sidelink data.

The at least two pieces of downlink control information are further used to determine the sequence of a transport block included in the first sidelink information and a transport block included in the second sidelink information. This means that downlink control information is further used to determine a sequence of extracting, from an uplink buffer, a plurality of data blocks included in sidelink information. The first downlink control information DCI 1 indicates sending of the first sidelink data, and the second downlink control information indicates sending of the second sidelink data. The first sidelink data is generated based on a TB extracted by the first terminal apparatus from the uplink buffer, and the second sidelink data is further generated based on a TB extracted by the first terminal apparatus from the uplink buffer. There is a sequence between data or parts in a data stream in the uplink buffer. When a final receive end of the data knows a sequence relationship of TBs corresponding to a plurality of pieces of received data, overall data transmitted by the first terminal apparatus to the receive end of the data is successfully restored.

An SUE sends the first sidelink data to CUE 1 on the first sidelink resource based on DCI 1, and the SUE sends the second sidelink data to CUE 1 on the second sidelink resource based on DCI 2. There is a direct sequence between TBs corresponding to the second sidelink data and the first sidelink data, and the sequence is indicated in a plurality of manners.

Manner A1: A plurality of pieces of DCI are separately transmitted in different control resource sets (Control resource sets, CORESETs). For example, when the first network apparatus transmits two pieces of DCI to the first terminal apparatus in a same slot, DCI 1 is transmitted in CORESET 1, and DCI 2 is transmitted in CORESET 2. CORESET 1 and CORESET 2 are preconfigured by the first network apparatus by using higher layer signaling such as RRC. A configuration of a CORESET includes signaling. The included signaling indicates, to the first terminal apparatus, whether the DCI in the CORESET is used to transmit TB 0 or TB 1. The configuration of the CORESET includes first signaling, used to indicate that the DCI included in a PDCCH transmitted in the CORESET is used to indicate to transmit TB 0 or TB 1. For example, the first signaling is 1 bit. When the first signaling in the configuration of the CORESET has a value of 0, the DCI included in the PDCCH transmitted in the CORESET is used to indicate TB 0. When the first signaling in the configuration of the CORESET has a value of 1, the DCI included in the PDCCH transmitted in the CORESET is used to indicate TB 1. The first terminal apparatus performs blind detection on CORESET 1, and receives DCI 1 that includes an ID of CUE 1 of a sidelink transmission target and corresponding transmission parameter configuration 1. The first terminal apparatus performs blind detection on CORESET 2, and receives DCI 2 that includes an ID of CUE 2 for sidelink transmission and corresponding transmission parameter configuration 2. Alternatively, DCI does not include ID information of a CUE, and an ID of the CUE is configured by using higher layer signaling and indicated by an ID of a CORESET. The transmission parameter configuration includes necessary information such as a time-frequency resource for PSSCH transmission, an MCS, HARQ information, uplink power control information, and precoding, and includes a time-frequency resource and the like for PSCCH transmission.

Manner A2: A plurality of pieces of DCI are separately transmitted in different control resource sets (Control resource sets, CORESETs). A rule preset by using higher layer signaling such as RRC is that a smaller value of an ID of CORESET 1 and an ID of CORESET 2 corresponds to transmission of TB 0, and a larger value of the ID of CORESET 1 and the ID of CORESET 2 corresponds to transmission of TB 1. A TB first extracted by the first terminal apparatus from an uplink buffer is referred to as TB 0, and a TB subsequently extracted from the uplink buffer is referred to as TB 1. When there are N CUEs, and N is greater than 2, the first network apparatus determines a one-to-one correspondence between IDs of N CORESETs and N TBs by using higher layer signaling such as RRC. An ID of each CORESET uniquely corresponds to one TB. When an SUE receives DCI_i in CORESET_j, an ID of a sidelink CUE included in DCI_i is q. Based on an indication of the higher layer signaling, IDj of CORESET_j corresponds to transmission of TB_j. Therefore, the SUE processes a $j^{th}$ TB (namely, TB_j) in the uplink buffer, and sends, on an $i^{th}$ sidelink resource indicated by DCI_i, the processed TB to the UE whose user identifier ID is q.

A sequence of TBs included in a plurality of pieces of sidelink data is determined by using indication signaling of a CORESET or an ID of the CORESET. Compared with a manner of blindly detecting a PDCCH, this manner effectively reduces blind detection complexity of the first terminal apparatus, and increases flexibility of an indication manner.

Manner B1: In one case, DCI 1 or DCI 2 is carried on a physical downlink control channel (Physical Downlink Control Channel, PDCCH). A plurality of PDCCHs are scrambled by using different physical sidelink radio network temporary identifiers (Sidelink Radio Network Temporary Identifiers, SL-RNTIs) respectively. The SL-RNTI indicates that control information included in the PDCCH is used to indicate sidelink transmission. For example, when the first network apparatus transmits two PDCCHs to the first terminal apparatus in a same slot, the two PDCCHs are scrambled by using SL-RNTI 1 and SL-RNTI 2, respectively. SL-RNTI 1 and SL-RNTI 2 are preconfigured by the first network apparatus for the terminal apparatus by using higher layer signaling such as RRC. SL-RNTI 1 indicates, to the first terminal apparatus, that control information in DCI 1 received by the first terminal apparatus is used to indicate sidelink transmission and corresponds to transmission of transport block 0 (Transport Block 0, TB 0). SL-RNTI 2 indicates, to the first terminal apparatus, that control information in DCI 2 received by the first terminal apparatus is used to indicate sidelink transmission and corresponds to transmission of TB 1. A TB first extracted by the first terminal apparatus from an uplink buffer is referred to as TB 0, and a TB subsequently extracted from the uplink buffer is referred to as TB 1. When there are N CUEs, and N is greater than 2, the first network apparatus determines a one-to-one correspondence between N SL-RNTIs and N TB s by using higher layer signaling such as RRC. Each SL-RNTI uniquely corresponds to one TB. When an SUE receives DCI_i, an ID of a sidelink CUE included in DCI_i is q, and scrambling information of DCI_i is SL-RNTI j. Based on an indication of the higher layer signaling, SL-RNTI_i corresponds to transmission of TB_j. Therefore, the SUE processes a $j^{th}$ TB (namely, TB_j) in the uplink buffer, and sends, on an $i^{th}$ sidelink resource indicated by DCI_i, the processed TB to the UE whose user identifier ID is q.

Manner B2: A rule is preset as that a smaller value of SL-RNTI 1 and SL-RNTI 2 corresponds to transmission of TB 0, and a larger value of SL-RNTI 1 and SL-RNTI 2 corresponds to transmission of TB 1. Alternatively, a rule is preset as that a larger value of SL-RNTI 1 and SL-RNTI 2 corresponds to transmission of TB 0, and a smaller value of SL-RNTI 1 and SL-RNTI 2 corresponds to transmission of TB 1. A TB first extracted by the first terminal apparatus from an uplink buffer is referred to as TB 0, and a TB subsequently extracted from the uplink buffer is referred to as TB 1. When there are N CUEs, and N is greater than 2, a rule is preset as that values of SL-RNTIs are sorted, a smallest value corresponds to transmission of TB 0, a second smallest value corresponds to transmission of TB 1, and a largest value corresponds to transmission of TB N. In this case, a TB first extracted by the first terminal apparatus from an uplink buffer is referred to as TB 0, and a TB last extracted from the uplink buffer is referred to as TB N.

The first terminal apparatus descrambles PDCCH 1 by using SL-RNTI 1. DCI 1 carried on PDCCH 1 includes an ID corresponding to a target second terminal apparatus (where the second terminal apparatus is referred to as CUE 1) for sidelink transmission and a corresponding transmission parameter configuration. Optionally, if a transmission target of DCI 1 is a plurality of CUEs, the ID is IDs of a group of CUEs, and is used to identify that the transmission is used for multicast. For example, if SL-RNTI 1 corresponds to transmission of TB 0, and DCI 1 scrambled by using SL-RNTI 1 includes a user identifier ID corresponding to CUE 1, the first terminal apparatus transmits TB 0 to CUE 1 over a sidelink.

The first terminal apparatus descrambles PDCCH 2 by using SL-RNTI 2. DCI 2 carried on PDCCH 2 includes an ID corresponding to a third terminal apparatus (where the third terminal apparatus is referred to as CUE 2) for sidelink transmission and corresponding transmission parameter configuration 2. For example, if SL-RNTI 2 corresponds to transmission of TB 1, and DCI 2 scrambled by using SL-RNTI 2 includes a user identifier ID corresponding to CUE 2, the first terminal apparatus transmits TB 1 to CUE 2 over a sidelink.

The transmission parameter configuration includes at least one of the following information: a time-frequency resource for sidelink transmission, a modulation and coding scheme MCS of sidelink transmission, a data volume of sidelink data, new data indication information of the sidelink data, a HARQ process number of the sidelink data, sidelink transmit power control information of the sidelink data, or a precoding matrix of the sidelink data.

For example, the first network apparatus configures a target ID in DCI 1 as 2, indicating that a cooperation UE is the second terminal apparatus. DCI 1 is scrambled by using SL-RNTI 1, SL-RNTI 1 indicates that information in DCI 1 corresponds to sidelink transmission, control information in DCI 1 corresponds to transmission of TB 0, and a sidelink data volume in DCI 1 is 10 bits.

As shown in Table 2, after successfully decoding DCI 1 by using SL-RNTI 1, the first terminal apparatus determines that DCI 1 is applicable to control information that indicates sidelink transmission, and DCI 1 is applicable to control information that indicates transmission of TB 0. DCI 1 includes the following information: A target terminal index ID is 2, indicating that a communication target is the second terminal apparatus. The data volume of the sidelink data is 10 bits, indicating that a size of TB 0 is 10 bits. The first terminal apparatus extracts 10 bit data from the uplink buffer, the data is TB 0, and the data is coded and modulated to obtain the first sidelink data. A sidelink resource indicated by DCI 1 is the first sidelink resource, and the first sidelink resource is used by the first terminal apparatus to send the first sidelink control information and the first sidelink data to the second terminal apparatus. A first transmission resource is a part of the first sidelink resource, and the first transmission resource is used to transmit the first sidelink data. The first terminal apparatus determines, by using SL-RNTI scrambling information, sequences of TBs included in a plurality of pieces of sidelink data. This indication manner is simple and clear.

TABLE 2

| Downlink control information | Scrambling information | Corresponding TB | Target terminal index ID | Data volume of sidelink data | Sidelink resource |
|---|---|---|---|---|---|
| DCI 1 | SL-RNTI 1 | TB 0 | 2 (corresponding to the second terminal apparatus) | 10 bits | First sidelink resource |

TABLE 2-continued

| Downlink control information | Scrambling information | Corresponding TB | Target terminal index ID | Data volume of sidelink data | Sidelink resource |
|---|---|---|---|---|---|
| DCI 2 | SL-RNTI 2 | TB 1 | 3 (corresponding to the third terminal apparatus) | 20 bits | Second sidelink resource |

Manner C: DCI 1 includes HARQ process number 1, and DCI 2 includes HARQ process number 2. Sidelink HARQ process numbers that is allocated by a base station are denoted as {a(0), a(1), . . . , a(N)} in ascending order, and each number is a nonnegative integer. Therefore, DCI including a smaller HARQ process number corresponds to transmission of TB 0, and DCI including a larger HARQ process number corresponds to transmission of TB 1. The first terminal apparatus determines, based on a number of a HARQ included in the DCI, sequences of TBs included in a plurality of pieces of sidelink data. This indication manner is easy to implement, and clearly expresses a correspondence between the number of the HARQ included in the DCI and the sequences of TBs included in the plurality of pieces of sidelink data.

In the foregoing several cases, the first terminal apparatus obtains a size of TB 0 based on configuration information in DCI 1. For example, the first terminal apparatus determines the size of TB 0 based on a data volume field that is of sidelink data and that is carried in the DCI. In addition, the first terminal apparatus further calculates the size of TB 0 based on information such as a time-frequency resource and an MCS carried in DCI 1. Similarly, the first terminal apparatus alternatively determines the size of TB 1 based on configuration information in DCI 2. The first terminal apparatus sequentially extracts TB 0 and TB 1 from a data buffer, and generates the first sidelink data and the second sidelink data respectively, or maps TB 0 and TB 1 to code word 0 and code word 1 respectively.

The first terminal apparatus sends the first sidelink control information and the first sidelink data to the second terminal apparatus based on DCI 1, where the first sidelink control information is carried on a PSCCH and sent, and the first sidelink control information is used to indicate a first transmission resource for sending the first sidelink data. The first sidelink control information is scrambled by using a cooperation terminal ID included in DCI 1, that is, is scrambled by using an ID of a user index corresponding to the second terminal apparatus, or the first sidelink control information includes a cooperation terminal ID carried in DCI 1. The first sidelink data is carried on a PSSCH and sent, and is carried on the first transmission resource. The second terminal apparatus performs blind detection on the PSCCH, and decodes, by using an ID of the second terminal apparatus, the first sidelink data carried on the PSCCH. After the second terminal apparatus successfully decodes, by using the ID of the second terminal apparatus, the first sidelink control information sent by the first terminal apparatus, the second terminal apparatus determines the first transmission resource indicated by the first sidelink control information. Alternatively, after the second terminal apparatus successfully decodes the first sidelink data carried on the PSCCH, if the cooperation terminal ID included in the sidelink control information is the ID of the second terminal apparatus, the second terminal apparatus receives the first sidelink data on the first transmission resource.

Similarly, the first terminal apparatus sends the second sidelink control information and the second sidelink data to the third terminal apparatus based on DCI 2. The second sidelink control information is carried on the PSCCH and sent, and the second sidelink control information is used to indicate a second transmission resource for sending the second sidelink data. The second sidelink control information is scrambled by using a cooperation terminal ID included in DCI 2, that is, is scrambled by using an ID corresponding to the third terminal apparatus, or the second sidelink control information includes a cooperation terminal ID carried in DCI 2. The second sidelink data is carried on a PSSCH and sent, and is carried on the second transmission resource. The third terminal apparatus performs blind detection on the PSCCH, and decodes, by using the ID of the third terminal apparatus, the second sidelink data carried on the PSCCH. After the third terminal apparatus successfully decodes, by using the ID of the third terminal apparatus, the second sidelink control information sent by the first terminal apparatus, the third terminal apparatus determines the second transmission resource indicated by the second sidelink control information. Alternatively, after the third terminal apparatus successfully decodes the second sidelink data carried on the PSCCH, if the cooperation terminal ID included in the sidelink control information is the ID of the third terminal apparatus, the third terminal apparatus receives the second sidelink data on the second transmission resource.

Optionally, the first sidelink resource includes the first transmission resource, and the first transmission resource is used to transmit the first sidelink data. The second sidelink resource includes the second transmission resource, and the second transmission resource is used to transmit the second sidelink data. Time domain or frequency domain relationships between the first transmission resource and the second transmission resource are diversified, and include but are not limited to the following manners:

Manner A: A time domain resource for the first transmission resource is the same as a time domain resource for the second transmission resource, and a frequency domain resource for the first transmission resource does not overlap a frequency domain resource for the second transmission resource. That the frequency domain resources do not overlap means that the first sidelink resource and the second sidelink resource occupy completely different frequency domains. That the time domain resources are the same means that the first terminal apparatus simultaneously sends the first sidelink data and the second sidelink data, or means that the first sidelink data and the second sidelink data are completely sent in one slot or several symbols. The first terminal apparatus simultaneously sends two or more pieces of sidelink data to the second terminal apparatus and the third terminal apparatus in one slot, that is, simultaneously sends two or more pieces of sidelink data to a plurality of cooperation terminal apparatuses in one slot. This manner is compared with a manner of sequentially sending two or more pieces of sidelink data to different terminal apparatuses in different slots. A delay in a sidelink transmission process is reduced, and time is saved for an overall cooperation process.

A time domain resource relationship and a frequency domain resource relationship between the first transmission resource used to transmit the first sidelink data and the second transmission resource used to transmit the second sidelink data are as follows:

Manner A1: The time domain resource for the first transmission resource is the same as the time domain resource for the second transmission resource, and the frequency domain resource for the first transmission resource does not overlap the frequency domain resource for the second transmission resource.

Manner A2: In another case, the time domain resource for the first transmission resource partially overlaps the time domain resource for the second transmission resource, and the frequency domain resource for the first transmission resource does not overlap the frequency domain resource for the second transmission resource.

In this method, the first terminal apparatus transmits a plurality of TBs to different CUEs in one time unit (for example, a slot), to reduce a delay of the first phase of transmission.

Figure 3:
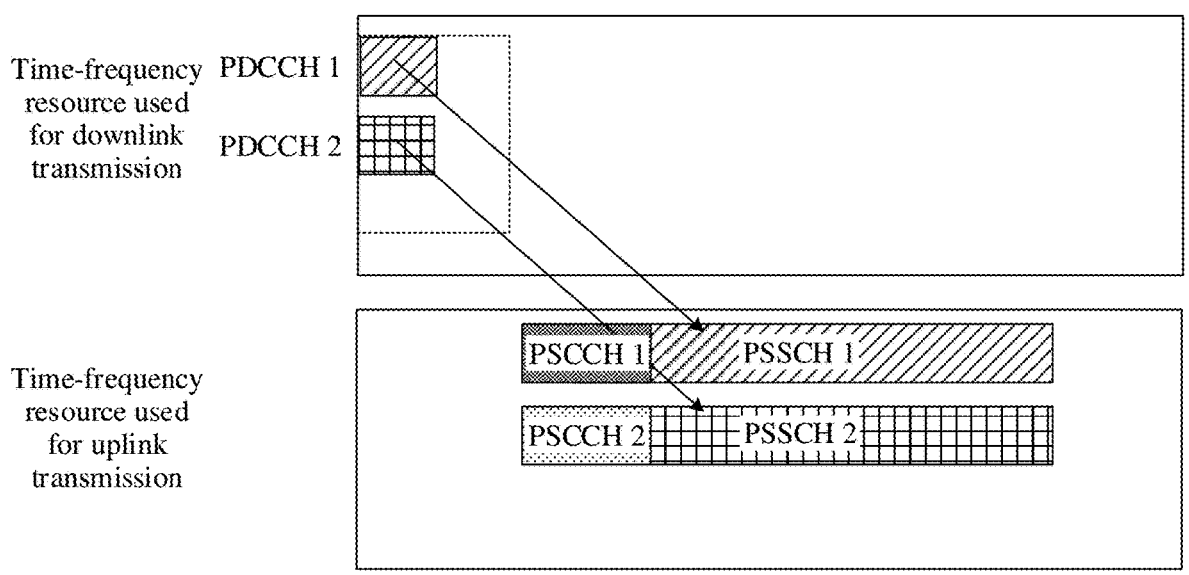
FIG. 3 is a schematic diagram of a time-frequency resource according to an embodiment of this application.

For example, as shown in FIG. 3, DCI 1 and DCI 2 are carried on a time-frequency resource used for downlink transmission, and DCI 1 and DCI 2 are sent in one slot. The first terminal apparatus sends, based on DCI 1 and DCI 2, PSCCH 1 and PSSCH 1 to the second terminal apparatus, and sends PSCCH 2 and PSSCH 2 to the third terminal apparatus. The first sidelink data is carried on PSSCH 1, and the second sidelink data is carried on PSSCH 2. The PSCCH and the PSSCH is carried on time domain resources for uplink transmission and sent. The time domain resource for the first transmission resource is the same as the time domain resource for the second transmission resource, and the frequency domain resource for the first transmission resource does not overlap the frequency domain resource for the second transmission resource.

Similarly, a relationship between transmission resources for PSCCH 1 and PSCCH 2 is similar to a relationship between transmission resources for PSSCH 1 and PSSCH 2, that is, the transmission resources is frequency division multiplexed. Alternatively, the first sidelink information includes the first sidelink control information and the first sidelink data, the second sidelink information includes the second sidelink control information and the second sidelink data, and the first sidelink resource on which the first sidelink information is located and the second sidelink resource on which the second sidelink information is located is time division multiplexed.

Optionally, because time-frequency resources configured by using a plurality of pieces of DCI is frequency division multiplexed, cyclic prefixes (Cyclic Shifts) and subcarrier spacings (Subcarrier Spacings) configured by DCI 1 and DCI 2 are the same. If the cyclic prefixes and the subcarrier spacings are different, the SUE independently and sequentially generates, in a baseband based on configuration information of DCI 1 and DCI 2, the first sidelink data and the second sidelink data that are superposed, and then simultaneously send the first sidelink data and the second sidelink data. The first sidelink data is generated by using TB 0, and the second sidelink data is generated by using TB 1. This increases a processing latency.

Optionally, the time unit is a slot, a mini-slot, several symbols, a resource configuration unit, or a subframe, or is another time unit.

Optionally, the first terminal apparatus performs sidelink power control, and determines a sidelink transmit power on a carrier according to the following formula: $P_{PSSCH}=\min\{P_{CMAX}, P_0(j)+\alpha(j) \cdot PL(q)+10 \cdot \log_{10}(2^\mu \cdot M_{RB})+\Delta_{TF}+\delta(1)\}$. P_CMAX is a maximum power allowed for the terminal apparatus for transmission on each carrier, and M_RB is a size of a resource for PSSCH transmission. The foregoing formula is simply explained as follows: A basic power of PSSCH transmission is a sum of a target receive power $(P_0(j)+10 \cdot \log_{10}(2^\mu \cdot M_{RB}))$ of a receive end and a sidelink path loss $(\alpha(j) \cdot PL(q))$, and $\Delta_{TF}+\delta(1)\}$ is a fine-tuned part of the transmission power. For a total target receive power of the receive end, $P_0(j)$ is a receive power of each resource block (Resource Block, RB) at the receive end. The receive power uses a 15 kHz subcarrier spacing as a reference, and $10 \cdot \log_{10}(2^\mu \cdot M_{RB})$ is related to a total quantity of RBs allocated by the terminal apparatus and an actual subcarrier spacing. For the sidelink path loss, PL( ) is an estimate of the path loss, $\alpha( )$ is information configured by the system and is related to the path loss. In addition, when there is one multiple-input multiple-output (Multiple-input Multiple-output, MIMO) layer, $\Delta_{TF}$ is not zero, and $\Delta_{TF}$ is related to the MCS for PSSCH transmission. Because different MCSs have their own optimal target receive powers, a transmit power further is adjusted based on different MCSs. The foregoing parameters are parameters related to open-loop power control, and have a relatively long configuration and change period. $\delta( )$ is a closed-loop power control parameter, and is adjusted in each dynamic scheduling process. Finally, the power for PSSCH transmission is unable to exceed a maximum transmit power $P_{CMAX}$ allowed by the terminal apparatus.

Because time-frequency resources configured by using a plurality of pieces of DCI, for example, the first transmission resource and the second transmission resource, is frequency division multiplexed, the first terminal apparatus obtains the transmission power by using a frequency domain resource for PSSCH 1 and a frequency domain resource for PSSCH 2 jointly. A quantity of RBs included in the frequency domain resource for PSSCH 1 is denoted as $M_1$, and a subcarrier spacing of PSSCH 1 is denoted as $\mu_1$. A quantity of RBs included in the frequency domain resource for PSSCH 2 is denoted as $M_2$, and a subcarrier spacing of PSSCH 2 is denoted as $\mu_2$. In a simple implementation solution, subcarrier spacings of PSSCH 1 and PSSCH 2 are the same, $\mu=\mu_1=\mu_2$. A total transmission power of sidelinks including PSSCH 1 and PSSCH 2 is as follows:

$$P_{PSSCH}=\min\{P_{CMAX}, P_0(j)+\alpha(j) \cdot PL(q)+10 \cdot \log_{10}(2^\mu \cdot (M_1+M_2))+\Delta_{TF}+\delta(1)\}$$

In another scenario with a wider application range, subcarrier spacings of PSSCH 1 and PSSCH 2 is different. A total uplink transmission power including PSSCH 1 and PSSCH 2 is as follows:

$$P_{PSSCH}=\min\{P_{CMAX}, P_0(j)+\alpha(j) \cdot PL(q)+10 \cdot \log_{10}(2^{\mu_1} \cdot M_1+2^{\mu_1} \cdot M_2))+\Delta_{TF}\delta(1)\}$$

Manner B: A time domain resource for the first transmission resource does not overlap a time domain resource for the second transmission resource. The first terminal apparatus sends sidelink data to one cooperation terminal apparatus at one moment. In Manner B, a frequency domain relationship is as follows:

Manner B1: The time domain resource for the first transmission resource does not overlap the time domain resource for the second transmission resource, and the frequency domain resource for the first transmission resource is the same as the frequency domain resource for the second transmission resource.

Manner B2: The time domain resource for the first transmission resource does not overlap the time domain resource for the second transmission resource, and the frequency domain resource for the first transmission resource is different from the frequency domain resource for the second transmission resource.

The time domain resource for the first transmission resource and the time domain resource for the second transmission resource is different mini-slots in a same slot, or is separately located in different slots.

According to the method, a power division problem caused by frequency division multiplexing in Manner A is avoided. For example, when a maximum power for sidelink transmission is 23 dBm, a sum of powers of PSSCH 1 and PSSCH 2 is not greater than 23 dBm. However, in this embodiment, maximum transmit powers of both PSSCH 1 and PSSCH 2 reaches 23 dBm, so that coverage of transmission from the first terminal to the second terminal and transmission from the second terminal to the third terminal is improved.

Figure 4:
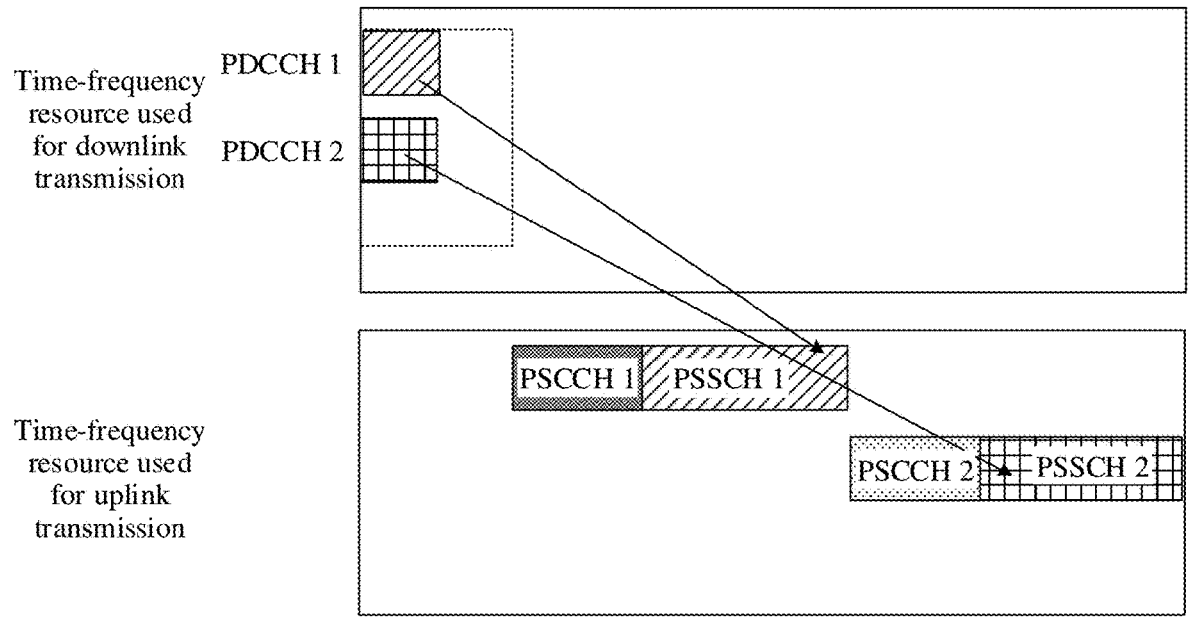
FIG. 4 is a schematic diagram of a time-frequency resource according to an embodiment of this application.

For example, as shown in FIG. 4, DCI 1 and DCI 2 are carried on a time-frequency resource for downlink transmission, and DCI 1 and DCI 2 are sent in one slot. The first terminal apparatus sends, based on DCI 1 and DCI 2, PSCCH 1 and PSSCH 1 to the second terminal apparatus, and sends PSCCH 2 and PSSCH 2 to the third terminal apparatus. The PSCCH and the PSSCH is carried on time domain resources for uplink transmission and sent. The first sidelink data is carried on PSSCH 1, the second sidelink data is carried on PSSCH 2, the time domain resource for the first transmission resource and the time domain resource for the second transmission resource occupy different mini-slots in one slot, and the frequency domain resource for the first transmission resource and the frequency domain resource for the second transmission resource are different. In this case, the first sidelink data and the second sidelink data are respectively sent to the second terminal apparatus and the third terminal apparatus in one slot. Compared with a manner of sequentially sending the first sidelink data and the second sidelink data in different slots, this manner reduces a sidelink transmission delay.

Similarly, a relationship between transmission resources for PSCCH 1 and PSCCH 2 is similar to a relationship between transmission resources for PSSCH 1 and PSSCH 2, that is, the transmission resources for PSCCH 1 and PSCCH 2 is time division multiplexed. Alternatively, the first sidelink information includes the first sidelink control information and the first sidelink data, the second sidelink information includes the second sidelink control information and the second sidelink data, and the first sidelink resource on which the first sidelink information is located and the second sidelink resource on which the second sidelink information is located is time division multiplexed.

Manner C: A time domain resource for the first transmission resource is the same as a time domain resource for the second transmission resource, a frequency domain resource for the first transmission resource is the same as a frequency domain resource for the second transmission resource, and an antenna port used to transmit the first sidelink data on the first transmission resource is different from an antenna port used to transmit the second sidelink data on the second transmission resource. Time-frequency transmission resources for a plurality of pieces of sidelink data is spatially multiplexed. For example, the first terminal apparatus transmits TB 0 to CUE 1 through antenna port 1 (or a plurality of antenna ports). For example, the first terminal apparatus transmits TB 1 to CUE 2 through antenna port 2 (or a plurality of antenna ports). In this case, the time domain resource for the first transmission resource is the same as the time domain resource for the second transmission resource, and the frequency domain resource for the first transmission resource is the same as the frequency domain resource for the second transmission resource. The first terminal apparatus evenly allocates powers on different antenna ports. For example, if a power used by the first terminal apparatus for PSSCH transmission is P, antenna port 1 is used for PSSCH 1 transmission, and antenna port 2 is used for PSSCH 2 transmission, a power used for PSSCH 1 transmission or PSSCH 2 transmission is P/2.

Figure 5:
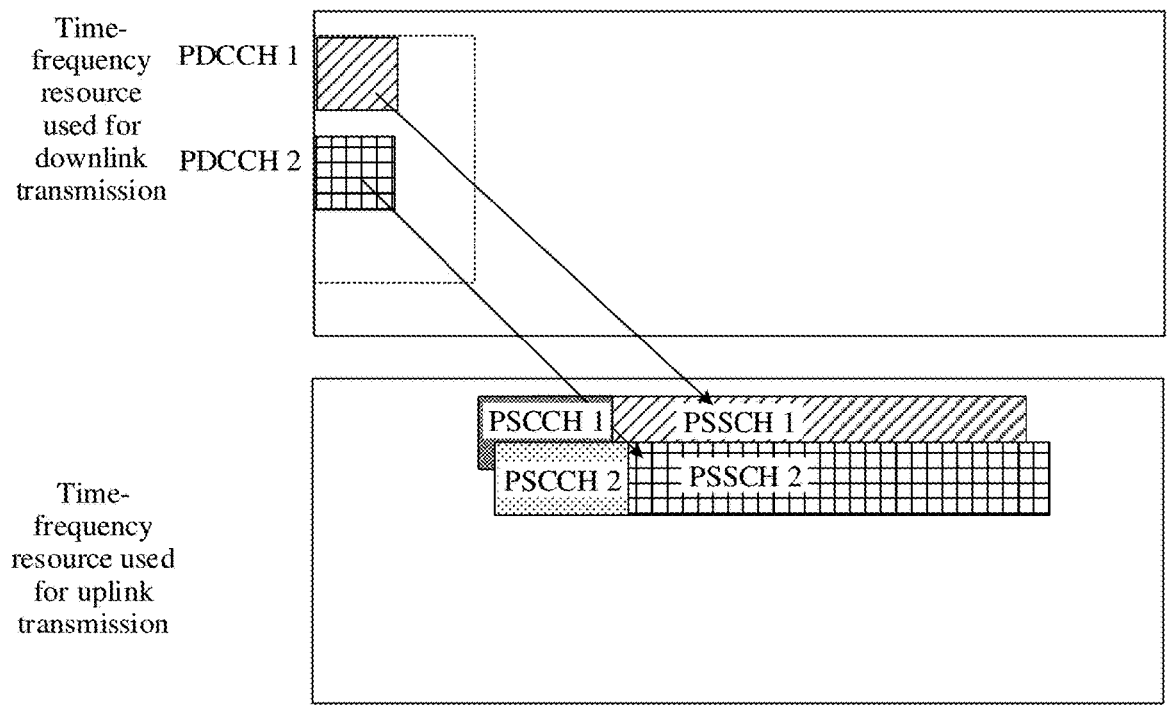
FIG. 5 is a schematic diagram of a time-frequency resource according to an embodiment of this application.

For example, as shown in FIG. 5, the time domain resource and the frequency domain resource for the first transmission resource are the same as the time domain resource and the frequency domain resource for the second transmission resource, and antenna ports for sidelink data transmission are different. Similarly, PSCCH 1 and PSCCH 2 is spatially multiplexed. Alternatively, the first sidelink information includes the first sidelink control information and the first sidelink data, the second sidelink information includes the second sidelink control information and the second sidelink data, and the first sidelink resource on which the first sidelink information is located and the second sidelink resource on which the second sidelink information is located is time division multiplexed.

Compared with Manner A and Manner B, this method improves spectrum efficiency of PSSCH transmission, so that the first network apparatus allocates more spectrum resources to another terminal apparatus for transmission.

Optionally, a relationship between a time-frequency resource for the first terminal apparatus to send sidelink control information and a time-frequency resource for sending sidelink data is not limited to that shown in FIG. 3, FIG. 4, and FIG. 5. Relationships of time-frequency resources for the PSCCH and the PSSCH are diversified.

Figure 14A:
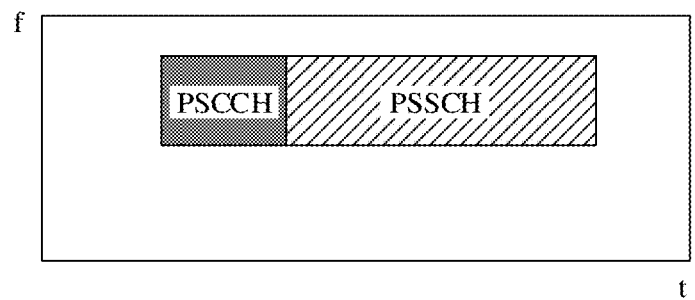
FIG. 14a to FIG. 14c are schematic diagrams of time-frequency resources for sidelink control information and data information according to an embodiment of this application.

Manner 1: As shown in FIG. 14a, the first terminal apparatus sends the first sidelink control information to the second terminal apparatus through a PSCCH, and sends the first sidelink data to the second terminal apparatus through a PSSCH. Frequency-domain resources occupied by the PSCCH and PSSCH are the same, and time-domain resources occupied by the PSCCH and the PSSCH are different.

Figure 14B:
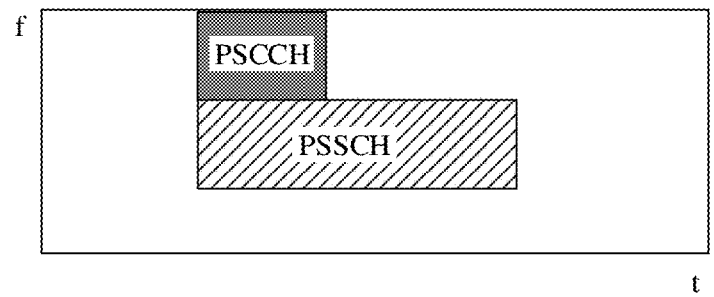

Manner 2: As shown in FIG. 14b, the first terminal apparatus sends the first sidelink control information to the second terminal apparatus through a PSCCH, and sends the first sidelink data to the second terminal apparatus through a PSSCH. Frequency-domain resources occupied by the PSCCH and the PSSCH do not overlap, and time-domain resources occupied by the PSCCH and the PSSCH partially overlap.

Figure 14C:
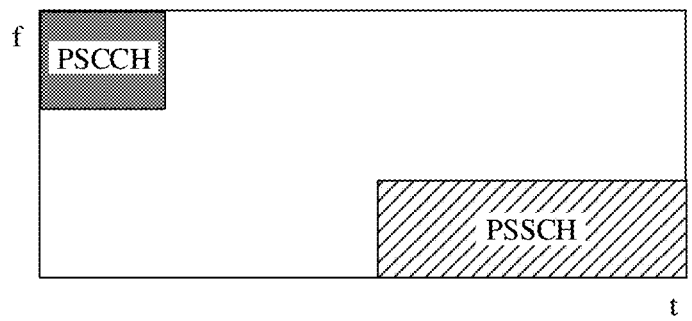

Manner 3: As shown in FIG. 14c, the first terminal apparatus sends the first sidelink control information to the second terminal apparatus through a PSCCH, and sends the first sidelink data to the second terminal apparatus through a PSSCH. Frequency domain resources occupied by the PSCCH and the PSSCH do not overlap, and time domain resources occupied by the PSCCH and the PSSCH do not partially overlap.

Optionally, the first network apparatus sends the first downlink control information and the second downlink control information, and the first terminal apparatus sends the first sidelink data and the second sidelink data in one slot. Alternatively, the first network apparatus sends the first downlink control information and the second downlink control information in the first slot, and the first terminal apparatus sends the first sidelink data and the second sidelink data in a second slot, where the second slot and the first slot are different slots. The first network apparatus sends the at least two pieces of downlink control information and the first terminal apparatus sends at least two pieces of sidelink information in one slot. Alternatively, the first network apparatus sends the at least two pieces of downlink control information in the first slot, and the first terminal apparatus sends at least two pieces of sidelink information in a second slot, where the second slot and the first slot are different slots. The first slot and the second slot alternatively is other time units, for example, a subframe, a resource configuration unit, or a scheduling unit.

Figure 6:
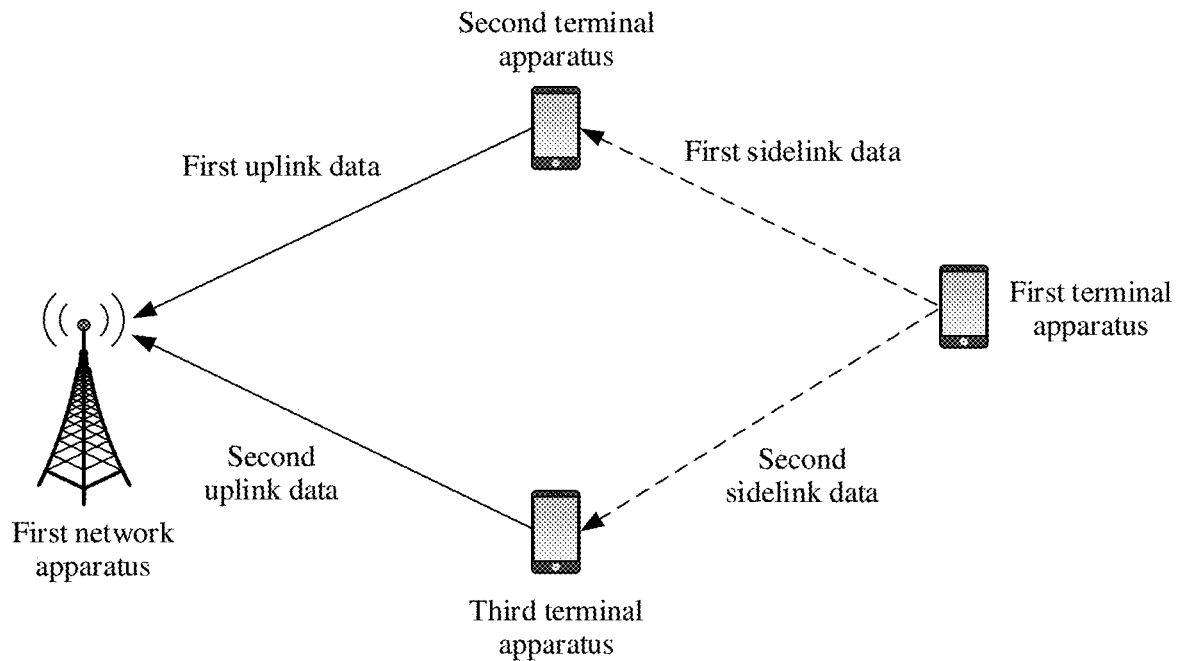
FIG. 6 is a schematic architectural diagram corresponding to Embodiment 2 of this application.
Figure 10:
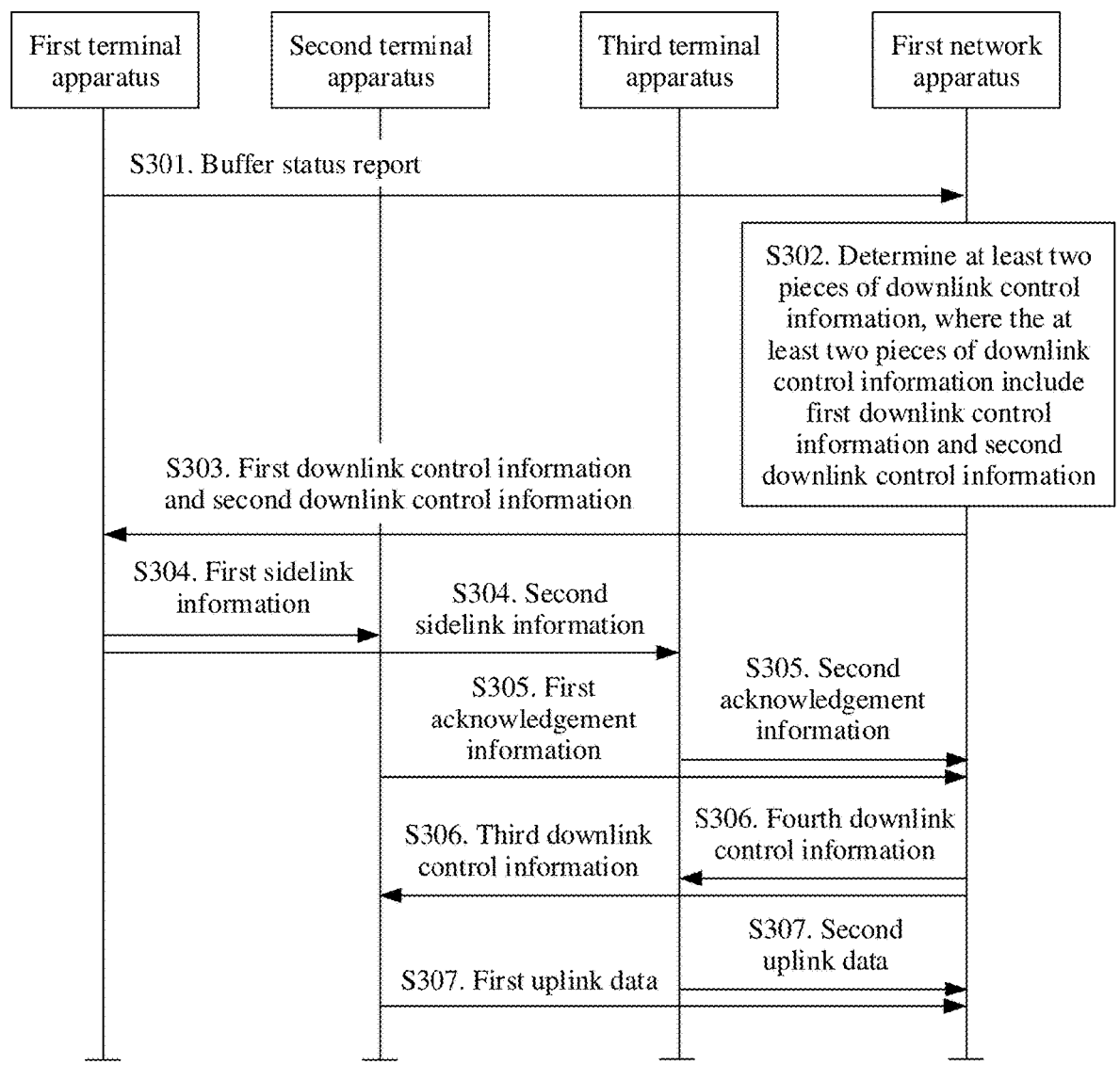
FIG. 10 is a schematic flowchart of a transmission method according to Embodiment 2 of this application.

FIG. 6 is a schematic diagram of Embodiment 2 of this application. FIG. 10 is a flowchart of a method according to Embodiment 2 of this application.

As shown in FIG. 6, uplink data transmission of a first terminal apparatus is divided into two phases. In the first phase, the first terminal apparatus sends first sidelink data and second sidelink data to a second terminal apparatus and a third terminal apparatus, respectively. In the second phase, the second terminal apparatus sends first uplink data to a first network apparatus, and the third terminal apparatus sends second uplink data to the first network apparatus. A process is shown in FIG. 10.

Optionally, before step S301, step S300 further exists. Step S300 includes the following steps:

S300A. When the first terminal apparatus has an uplink data transmission condition, a transceiver unit 1501 of the first terminal apparatus sends a scheduling request to the first network apparatus. For details, refer to S200A.

S300B. After receiving the scheduling request, a transceiver unit 1801 of the first network apparatus sends downlink control information to the first terminal apparatus. For details, refer to S200B.

S301. The transceiver unit 1501 of the first terminal apparatus sends a buffer status report to the first network apparatus, and the transceiver unit of the first network apparatus receives the buffer status report from the first terminal apparatus.

For details of S301, refer to S200C.

S302. A determining unit 1802 of the first network apparatus determines at least two pieces of downlink control information, where the at least two pieces of downlink control information include first downlink control information and second downlink control information.

For details of S302, refer to S201.

S303. The transceiver unit 1801 of the first network apparatus sends the first downlink control information and the second downlink control information to the first terminal apparatus, and the transceiver unit 1501 of the first terminal apparatus receives the first downlink control information and the second downlink control information from the first network apparatus.

For details of S303, refer to S202.

S304. The transceiver unit 1501 of the first terminal apparatus sends first sidelink information including first sidelink control information and the first sidelink data to the second terminal apparatus based on the first downlink control information, and a transceiver unit 1601 of the second terminal apparatus receives the first sidelink information that is from the first terminal apparatus and that includes the first sidelink control information and the first sidelink data; and the transceiver unit 1501 of the first terminal apparatus sends second sidelink information including second sidelink control information and the second sidelink data to the third terminal apparatus based on the second downlink control information, and a transceiver unit 1601 of the third terminal apparatus receives the second sidelink control information and the second sidelink data from the first terminal apparatus.

For details of S304, refer to S203.

S305. The transceiver unit 1601 of the second terminal apparatus sends first acknowledgement information to the first network apparatus, and the transceiver unit 1801 of the first network apparatus receives the first acknowledgement information from the second terminal apparatus, where the first acknowledgement information is used to indicate whether the second terminal apparatus successfully receives the first sidelink data; and a transceiver unit 1701 of the third terminal apparatus sends second acknowledgement information to the first network apparatus, and the transceiver unit 1801 of the first network apparatus receives the second acknowledgement information from the third terminal apparatus, where the second acknowledgement information is used to indicate whether the third terminal apparatus successfully receives the second sidelink data.

Optionally, after successfully receiving and decoding the first sidelink data from the first terminal apparatus, the second terminal apparatus generates a first acknowledgement message, namely, an ACK, and sends the first acknowledgement message to the first network apparatus, to notify the first terminal apparatus that the first sidelink data is successfully received. Similarly, after successfully receiving and decoding the second sidelink data, the third terminal apparatus further sends an ACK to the first network apparatus.

S306. The transceiver unit 1801 of the first network apparatus sends third downlink control information to the second terminal apparatus, and the transceiver unit 1801 of the first network apparatus sends fourth downlink control information to the third terminal apparatus.

Optionally, the processing unit 1802 of the first network apparatus determines the third downlink control information based on the first acknowledgement information, and determines the fourth downlink control information based on the second acknowledgement information.

The third downlink control information is used to indicate a first uplink resource, and the first uplink resource is used to transmit first uplink data. The fourth downlink control information is used to indicate a second uplink resource, and the second uplink resource is used to transmit second uplink data.

The first uplink data is determined based on the first sidelink data, and the second uplink data is determined based on the second sidelink data.

After receiving ACKs of the second terminal apparatus and the third terminal apparatus, the first network apparatus configures an uplink data transmission resource, that is, the first uplink resource, for the second terminal apparatus, configures the second uplink resource for the third terminal apparatus, sends uplink resource information to the second terminal apparatus by using the third downlink control information, and sends the uplink resource information to the third terminal apparatus by using the fourth downlink control information. After receiving the third downlink control information, the second terminal apparatus determines the first uplink resource. After decoding, coding, and modulating the first sidelink data, the second terminal apparatus generates the first uplink data. Similarly, the third terminal apparatus generates the second uplink data based on the second sidelink data, and determines the second uplink resource based on the fourth downlink control information.

S307. The transceiver unit 1601 of the second terminal apparatus sends the first uplink data to the first network apparatus, and the transceiver unit 1701 of the third terminal apparatus sends the second uplink data to the first network apparatus.

After the first network apparatus receives the first uplink data and the second uplink data, an entire uplink cooperation transmission process is completed. The first terminal apparatus sends TB 0 and TB 1 to the first network apparatus with the assistance of the second terminal apparatus and the third terminal apparatus, thereby improving an uplink transmission capability of the first terminal apparatus. In addition, a delay in a cooperation process is reduced by simultaneously delivering a plurality of pieces of DCI and simultaneously transmitting a plurality of pieces of sidelink data, and transmission efficiency is improved.

Figure 7:
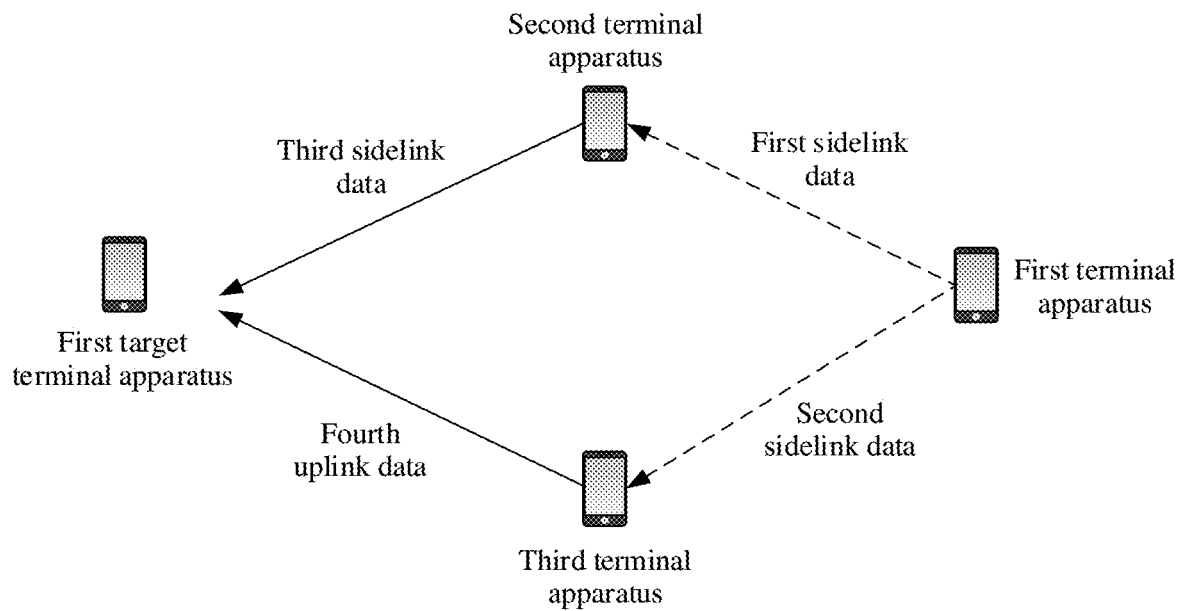
FIG. 7 is a schematic architectural diagram corresponding to Embodiment 3 of this application.
Figure 11:
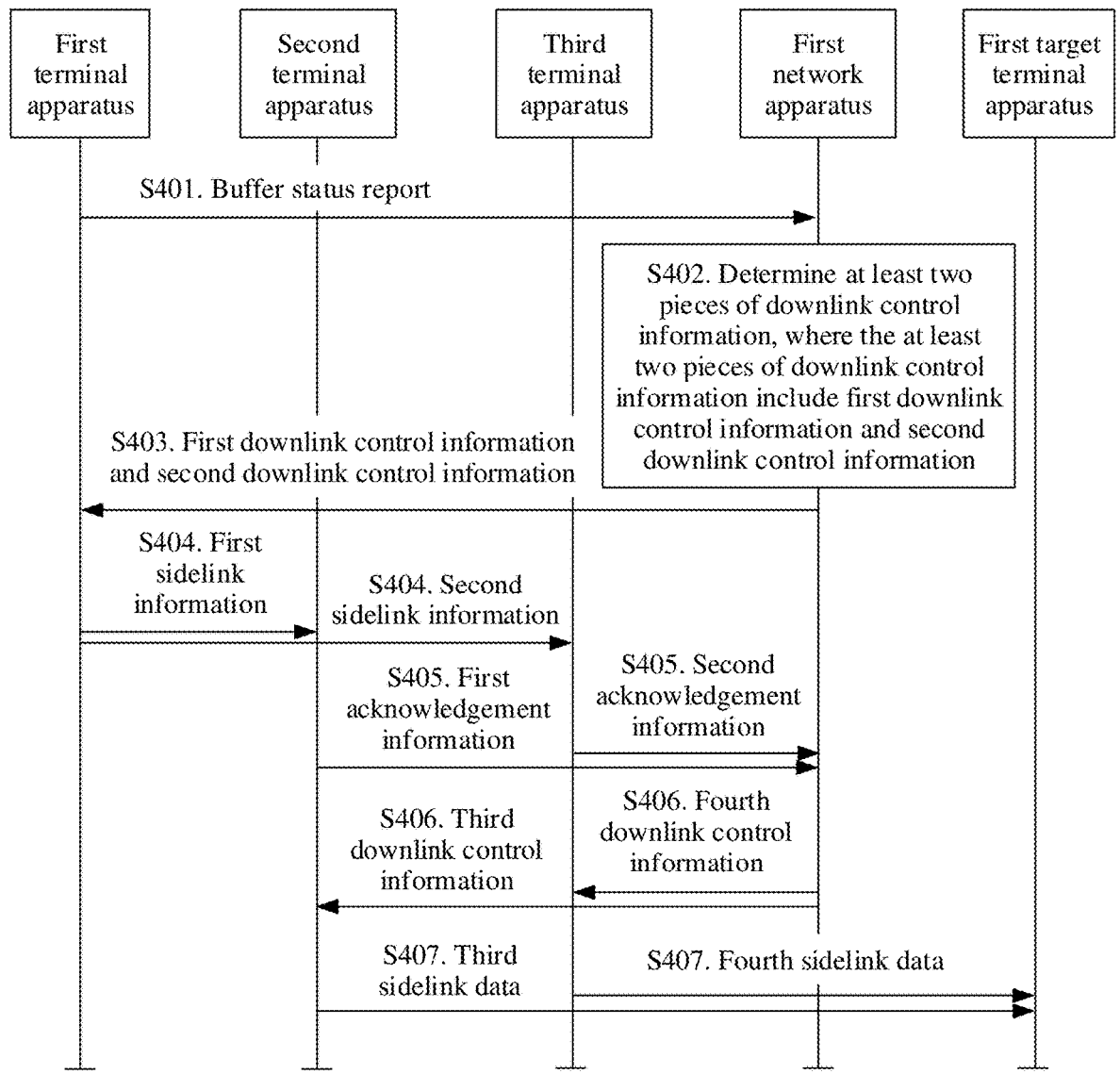
FIG. 11 is a schematic flowchart of a transmission method according to Embodiment 3 of this application.

FIG. 7 is a schematic diagram of Embodiment 3 of this application. FIG. 11 is a flowchart of a method according to Embodiment 3 of this application.

A difference between the embodiment of FIG. 7 and the embodiment of FIG. 6 lies in that a final data receive end is a terminal apparatus instead of a network apparatus. FIG. 7 shows a scenario of cooperation transmission over sidelinks. In this scenario, through forwarding performed by an idle terminal apparatus, a first terminal apparatus transmits data to a first target terminal apparatus, to complete a cooperation process. A procedure is shown in FIG. 11.

A process of S401 to S405 is the same as that of S301 to S305, and details are not described again.

S406. The transceiver unit 1801 of the first network apparatus sends third downlink control information to the second terminal apparatus, and the transceiver unit 1801 of the first network apparatus sends fourth downlink control information to the third terminal apparatus.

Optionally, the processing unit 1802 of the first network apparatus determines the third downlink control information based on the first acknowledgement information, and determines the fourth downlink control information based on the second acknowledgement information.

The third downlink control information is used to indicate a third sidelink resource, a first uplink resource is used to transmit third sidelink data, the fourth downlink control information is used to indicate the fourth sidelink resource, and a second uplink resource is used to transmit fourth sidelink data.

The third sidelink data is determined based on the first sidelink data, and the fourth sidelink data is determined based on the second sidelink data.

After receiving ACKs of the second terminal apparatus and the third terminal apparatus, the first network apparatus configures a sidelink data transmission resource, that is, the third sidelink resource, for the second terminal apparatus, configures the fourth sidelink resource for the third terminal apparatus, sends sidelink resource information to the second terminal apparatus by using the third downlink control information, and sends the sidelink resource information to the third terminal apparatus by using the fourth downlink control information. After receiving the third downlink control information, the second terminal apparatus determines the third sidelink resource. After decoding, coding, and modulating the first sidelink data, the second terminal apparatus generates the third sidelink data. Similarly, the third terminal apparatus generates the fourth sidelink data based on the second sidelink data, and determines the fourth sidelink resource based on the fourth downlink control information.

S407. The transceiver unit 1601 of the second terminal apparatus sends the third sidelink data to the first target terminal apparatus, the transceiver unit 1701 of the third terminal apparatus sends the fourth sidelink data to the first target terminal apparatus, and a transceiver unit 1901 of the first target terminal apparatus receives the third sidelink data from the second terminal apparatus and the fourth sidelink data from the third terminal apparatus.

The first terminal apparatus sends TB 0 and TB 1 to the first target terminal apparatus with the assistance of the second terminal apparatus and the third terminal apparatus, thereby improving a sidelink transmission capability of the first terminal apparatus. In addition, a delay in a cooperation process is reduced by simultaneously delivering a plurality of pieces of DCI and simultaneously transmitting a plurality of pieces of sidelink data, transmission efficiency is improved.

Figure 8:
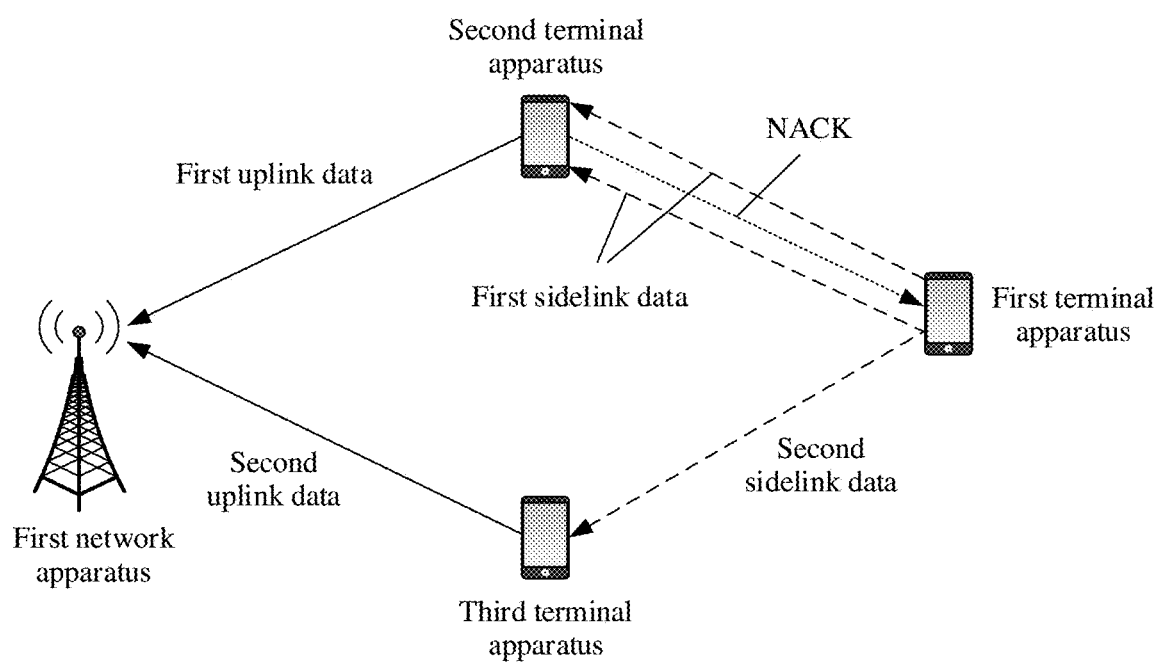
FIG. 8 is a schematic architectural diagram corresponding to Embodiment 4 of this application.
Figure 12:
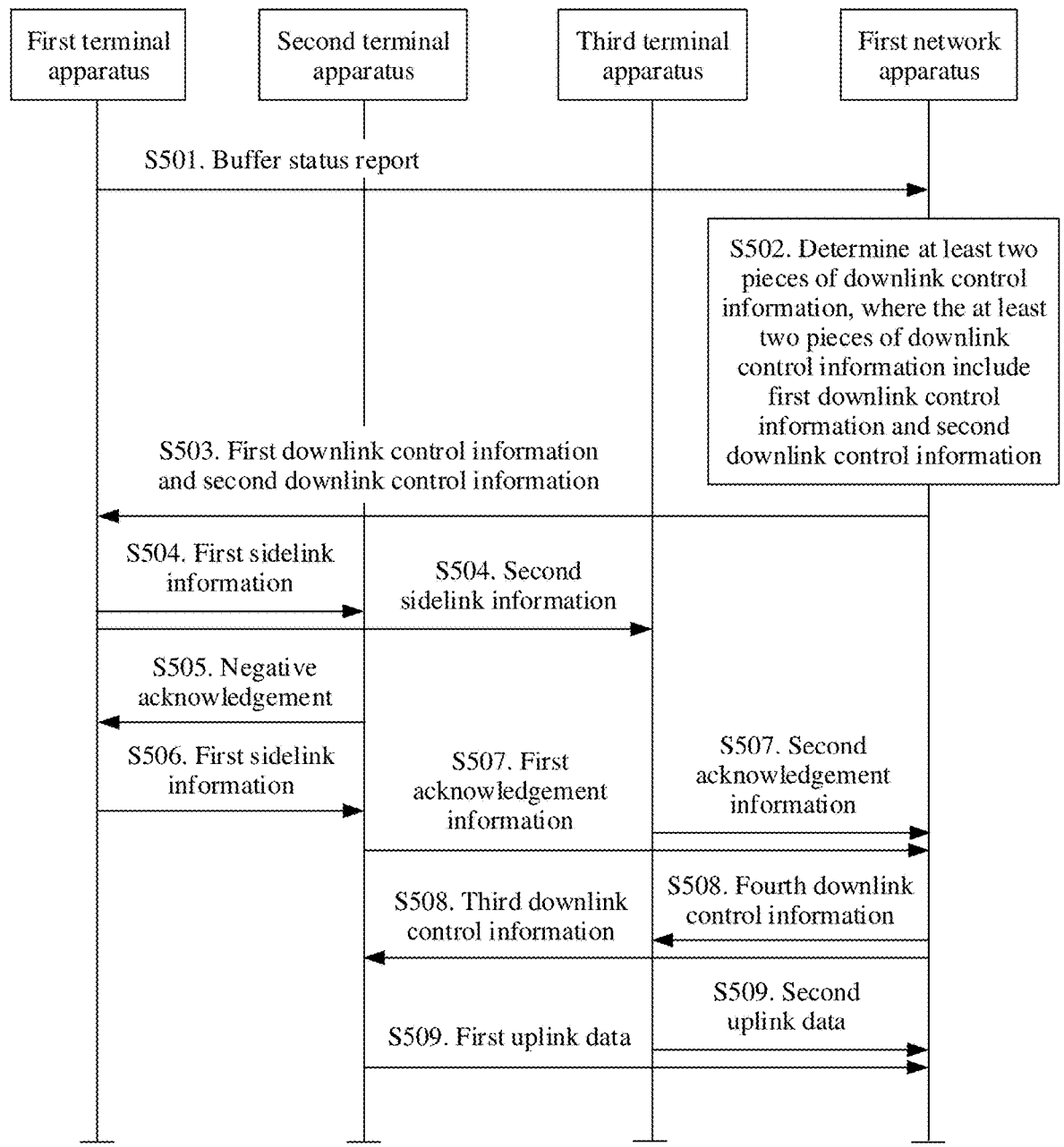
FIG. 12 is a schematic flowchart of a transmission method according to Embodiment 4 of this application.

FIG. 8 is a schematic diagram of Embodiment 4 of this application. FIG. 12 is a flowchart of a method according to Embodiment 4 of this application.

A process of S501 to S504 is the same as that of S301 to S304, and details are not described again.

S505. When the second terminal apparatus successfully receives the first sidelink data, the transceiver unit 1601 of the second terminal apparatus sends an acknowledgement ACK to the first terminal apparatus. When the second terminal apparatus fails to receive the first sidelink data, the transceiver unit 1601 of the second terminal apparatus sends a negative acknowledgement NACK to the first terminal apparatus. Similarly, the third terminal apparatus sends an ACK to the first terminal apparatus when the sidelink data is successfully received, and sends a NACK to the first terminal apparatus when the sidelink data fails to be received. The ACK/NACK is 1 bit. For example, when a value is 0, indicating correct reception, or when a value is 1, indicating incorrect reception. A sending resource for the ACK/NACK is a next physical sidelink feedback channel (Physical Sidelink Feedback Channel, PSFCH) closest to a time point of successful or failed reception. Alternatively, a plurality of ACK/NACK acknowledgements are simultaneously sent to the first terminal apparatus, and the plurality of ACK/NACK messages are code division multiplexed.

S506. The transceiver unit of the first terminal apparatus retransmits the first sidelink data to the second terminal apparatus.

Optionally, in addition to retransmitting a received NACK message, a first time threshold is further set out. If the first terminal apparatus does not receive an ACK message of the second terminal apparatus within the first time threshold, the first terminal apparatus automatically retransmits the first sidelink data. The retransmission mechanism increases a probability of successfully transmitting data in a data transmission process, and improves transmission reliability.

For S507 to S509, refer to S305 to S307.

Figure 9:
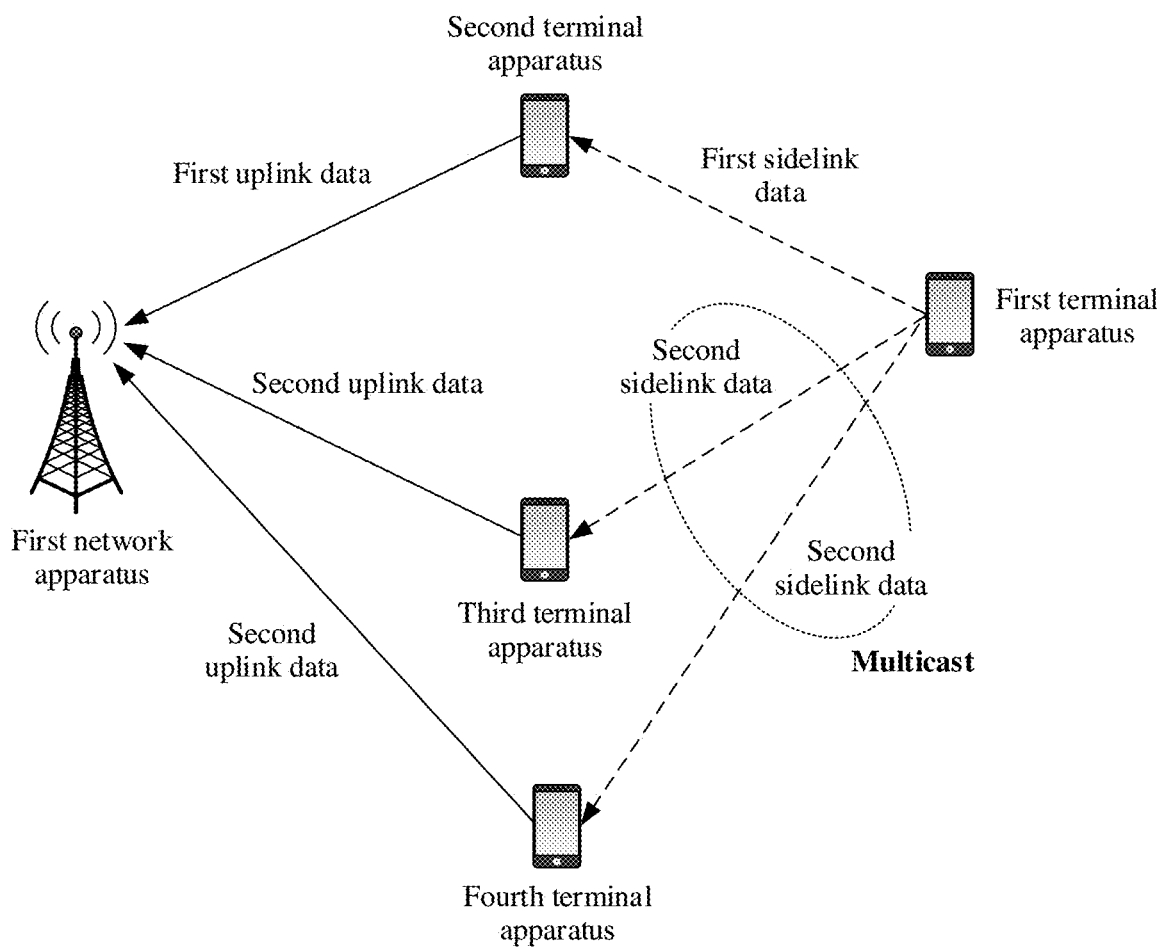
FIG. 9 is a schematic architectural diagram corresponding to Embodiment 5 of this application.
Figure 13:
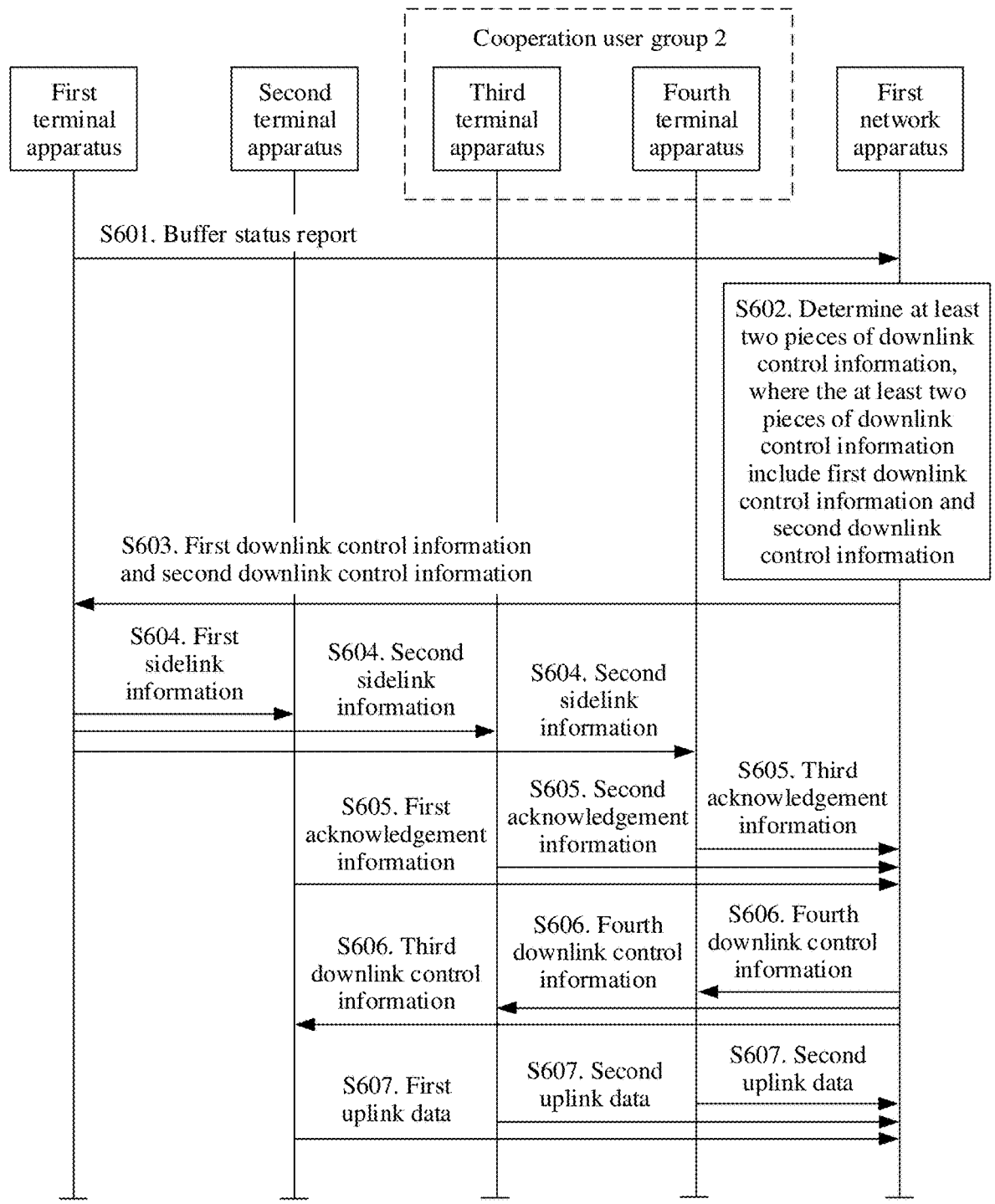
FIG. 13 is a schematic flowchart of a transmission method according to Embodiment 5 of this application.

FIG. 9 is a schematic diagram of Embodiment 5 of this application. FIG. 13 is a flowchart of a method according to Embodiment 5 of this application.

A process of S601 to S603 is the same as a process of S301 to S303.

S604. A difference between S604 and S304 lies in that the transceiver unit 1501 of the first terminal apparatus further sends second sidelink control information and second data to a fourth terminal apparatus.

The fourth terminal apparatus and the third terminal apparatus form cooperation user group 2, and the first terminal apparatus sends the second sidelink control information and the second sidelink data to the third terminal apparatus and the fourth terminal apparatus in a multicast manner. The second sidelink control information is scrambled by using a group ID of the cooperation user group. The third terminal apparatus and the fourth terminal apparatus perform blind detection on a PSCCH, and successfully decode the sidelink control information by using the group ID. Therefore, both the fourth terminal apparatus and the third terminal apparatus receive the second sidelink data on a time-frequency resource indicated by the second sidelink control information. A transmission success rate of the second sidelink data is improved in the multicast manner.

S605. Based on S305, the fourth terminal apparatus sends third acknowledgement information to the first network apparatus after successfully receiving the second sidelink data.

S606. The first network apparatus delivers fourth downlink control information to cooperation user group 2.

Similarly, DCI 4 includes group ID information, used to indicate that a second uplink resource indicated by the DCI is shared by the cooperation user group.

S607. Based on S607, the fourth terminal apparatus further sends the second uplink data to the first network apparatus on the second uplink resource.

After decoding, coding, and modulating the second sidelink data, the fourth terminal apparatus generates the second uplink data. A success rate of successfully receiving the second uplink data by the first network apparatus is improved.

Figure 20:
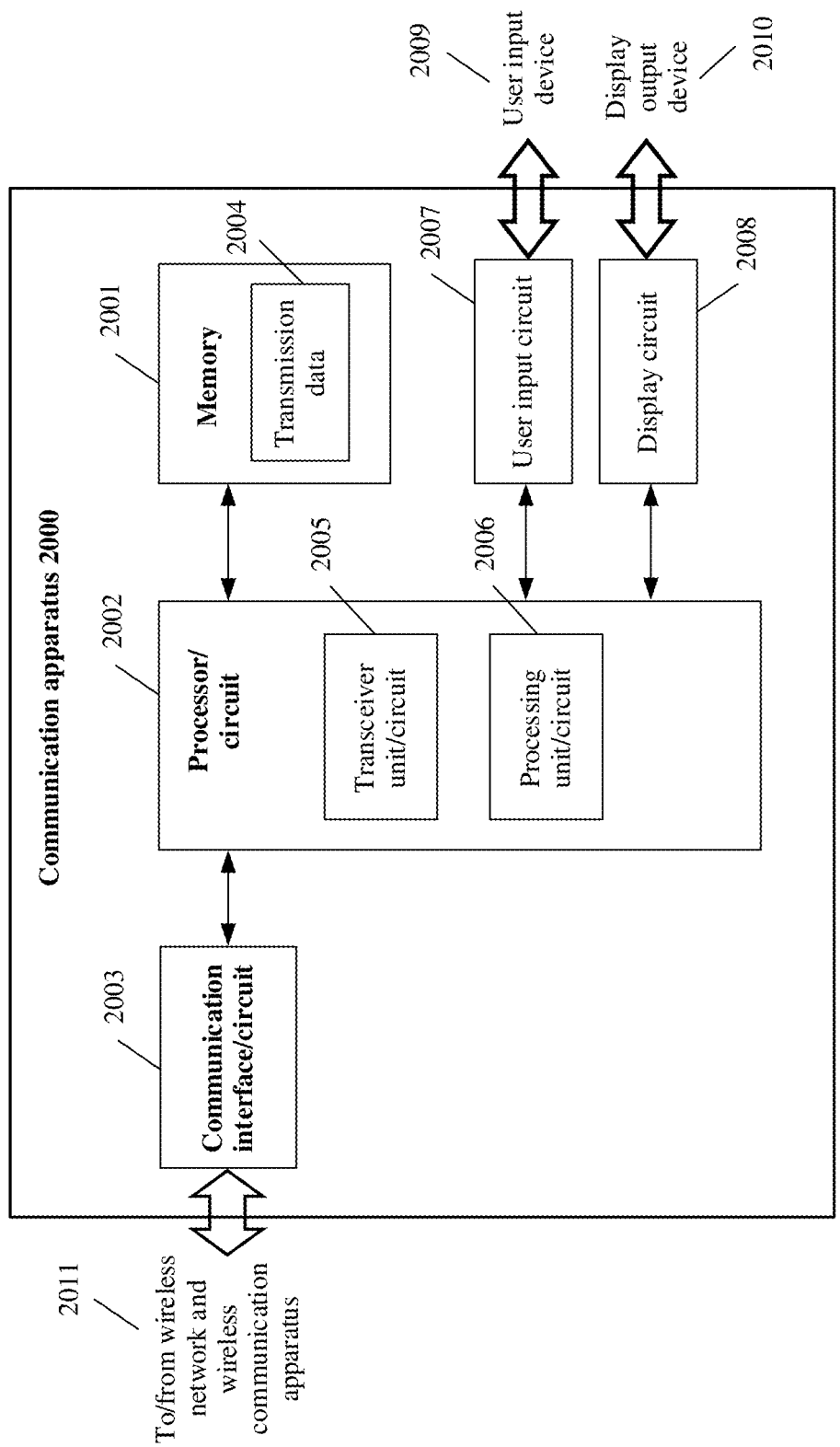
FIG. 20 shows a communication apparatus according to an embodiment of this application.

FIG. 20 is a schematic block diagram of a communication apparatus 2000 according to an embodiment of this application. The communication apparatus 2000 includes a processor/circuit 2002 and a memory 2001 that are coupled to a communication interface/circuit 2003, and further includes a user input circuit 2007 and/or a display circuit 2008. The communication circuit 2003 is configured to perform wireless communication with two or more different wireless networks 2011 or wireless communication apparatuses (for example, a target device, a cooperation device, or another adjacent device). The communication apparatus 2000 performs the steps performed by the terminal apparatus in the method in FIG. 2 or in another embodiment. To avoid repetition, details are not described herein again.

The memory 2001 is configured to store a program, and the memory further stores transmission data 2004 or other data such as channel data. When the communication apparatus 2000 is a second or third terminal apparatus, the transmission data 2004 is decoded and coded by the second or third terminal apparatus and relayed to a first network apparatus or a first target terminal apparatus.

The processor/circuit 2002 includes a transceiver unit/circuit 2005. The transceiver unit/circuit 2005 is configured to receive each piece of downlink control information from the first network apparatus or sidelink control information or sidelink data or acknowledgement information from another terminal apparatus through the communication interface/circuit 2003. The transceiver unit/circuit 2005 is further configured to send a scheduling request, a buffer status report, acknowledgement information, or uplink data to the first network apparatus through the communication interface/circuit 2003, or send sidelink control information or sidelink data to another terminal apparatus.

The processor/circuit 2002 further includes a processing unit/circuit 2006. The processing unit/circuit 2006 is configured to perform processing such as decoding and then coding on received sidelink data, or perform an operation such as extracting data from an uplink buffer.

The user input circuit 2007 is interfaced and coupled to an external user input device 2009, and the display circuit 2008 is interfaced and coupled to an external display output device 2010. In addition to obtaining an input from the user input device 2009, the user input circuit 2007 further provides output control through an interactive display (for example, a touchscreen or other external hardware that is viewed by a user). Similarly, in addition to displaying a visual output in a graphical user interface (GUI) or another user interface (UI), the display circuit 2008 further provides a user input option by using an interactive display component (for example, a touchscreen or other interactive external hardware that is used by the user).

The communication apparatus 2000 shown in FIG. 20 is a chip or a circuit, for example, a chip or a circuit that is disposed in a terminal device. The communication interface/circuit 2003 alternatively is a transceiver. The transceiver includes a receiver and a transmitter. Further, the communication apparatus 2000 further includes a bus system.

The processor/circuit 2002, the memory 2001, the receiver, and the transmitter are coupled and connected, and communicates with each other, or is connected by using a bus system. The processor/circuit 2002 is configured to execute instructions stored in the memory 2001, to control the receiver to receive a signal and control the transmitter to send a signal, to complete the steps of the network device in the communication method in this application. The receiver and the transmitter is a same physical entity or different physical entities. When the receiver and the transmitter are a same physical entity, the receiver and the transmitter is collectively referred to as a transceiver. The memory 2001 is integrated into the processor/circuit 2002, or is separated from the processor 2002.

In an implementation, functions of the receiver and the transmitter is considered to be implemented through a transceiver circuit or a dedicated transceiver chip. The processor/circuit 2002 is implemented by using a dedicated processing chip, a processing circuit, a processor, or a general-purpose chip.

Figure 21:
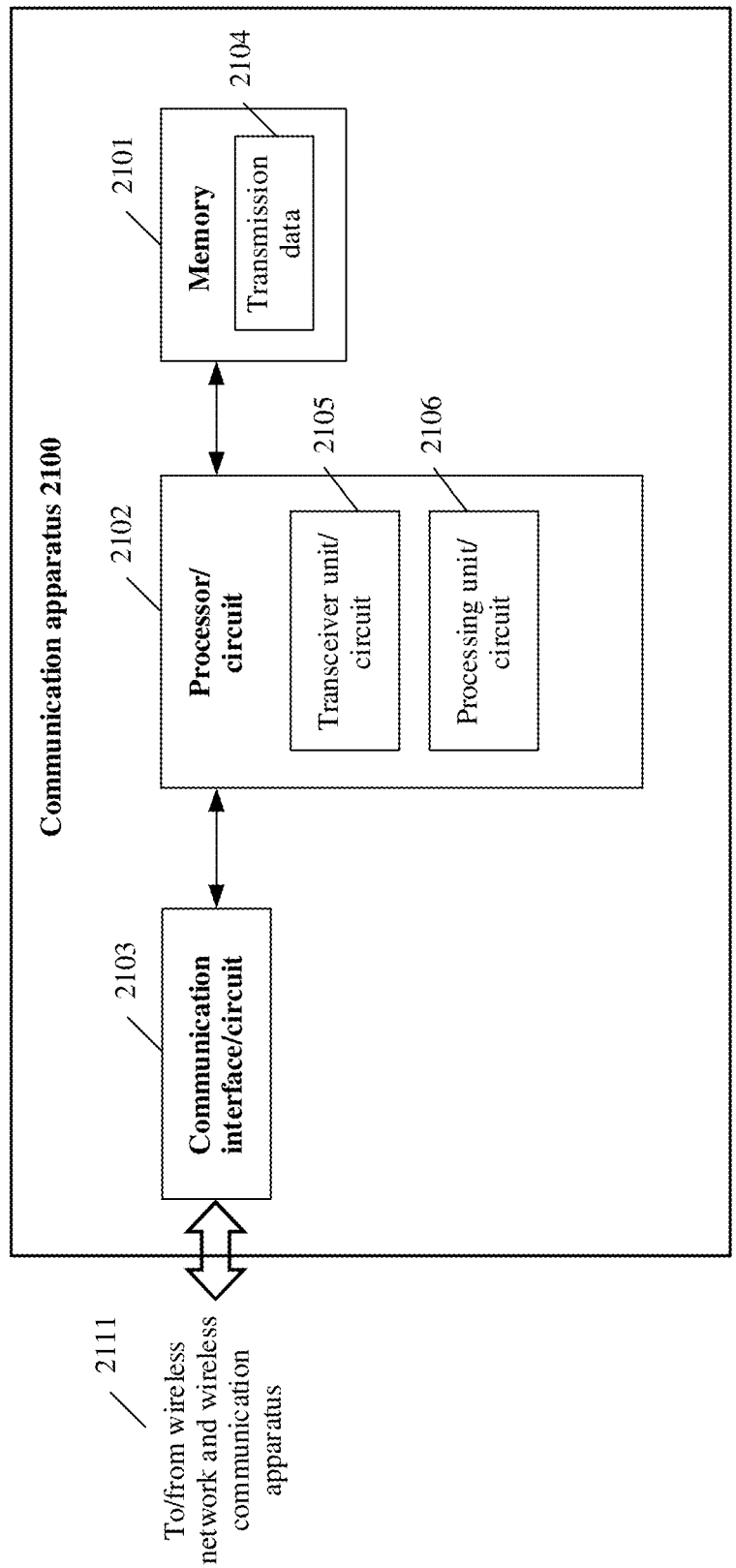
FIG. 21 shows a network communication apparatus according to an embodiment of this application.

FIG. 21 is a schematic block diagram of a communication apparatus 2100 according to an embodiment of this application. The communication apparatus 2100 includes a processor/circuit 2102 and a memory 2101 that are coupled to a communication interface/circuit 2103. The communication circuit 2103 is configured to perform wireless communication with two or more different wireless networks 2111 or wireless communication apparatuses (for example, a target device, a cooperation device, or another adjacent device). The communication apparatus 2100 performs the steps performed by the network apparatus in the method in FIG. 2 or in another embodiment. To avoid repetition, details are not described herein again.

The memory 2001 is configured to store a program, and the memory further stores transmission data 2104 or other data such as channel data. The transmission data 2004 or the channel data 2004 is used to store uplink data or acknowledgement information received from the terminal apparatus.

The processor/circuit 2102 includes a transceiver unit/circuit 2105. The transceiver unit/circuit 2105 is configured to receive a buffer status report, acknowledgement information, and uplink data from each terminal apparatus through the communication interface/circuit 2103. The transceiver unit/circuit 2105 is further configured to send downlink control information to the terminal apparatus through the communication interface/circuit 2103.

The processor/circuit 2102 further includes a processing unit/circuit 2106. The processing unit/circuit 2106 is configured to determine at least two pieces of downlink control information based on the buffer status report.

The communication apparatus 2100 shown in FIG. 21 is a chip or a circuit. For example, a chip or a circuit that is disposed in a terminal device. The communication interface/circuit 2103 alternatively is a transceiver. The transceiver includes a receiver and a transmitter. Further, the communication apparatus 2100 further includes a bus system.

The processor/circuit 2102, the memory 2101, the receiver, and the transmitter are coupled and connected, and communicates with each other, or is connected by using a bus system. The processor/circuit 2102 is configured to execute instructions stored in the memory 2101, to control the receiver to receive a signal and control the transmitter to send a signal, to complete the steps of the network device in the communication method in this application. The receiver and the transmitter is a same physical entity or different physical entities. When the receiver and the transmitter are a same physical entity, the receiver and the transmitter is collectively referred to as a transceiver. The memory 2101 is integrated into the processor/circuit 2102, or is separated from the processor 2102.

In an implementation, functions of the receiver and the transmitter is considered to be implemented through a transceiver circuit or a dedicated transceiver chip. The processor/circuit 2102 is implemented by using a dedicated processing chip, a processing circuit, a processor, or a general-purpose chip.

Figure 22:
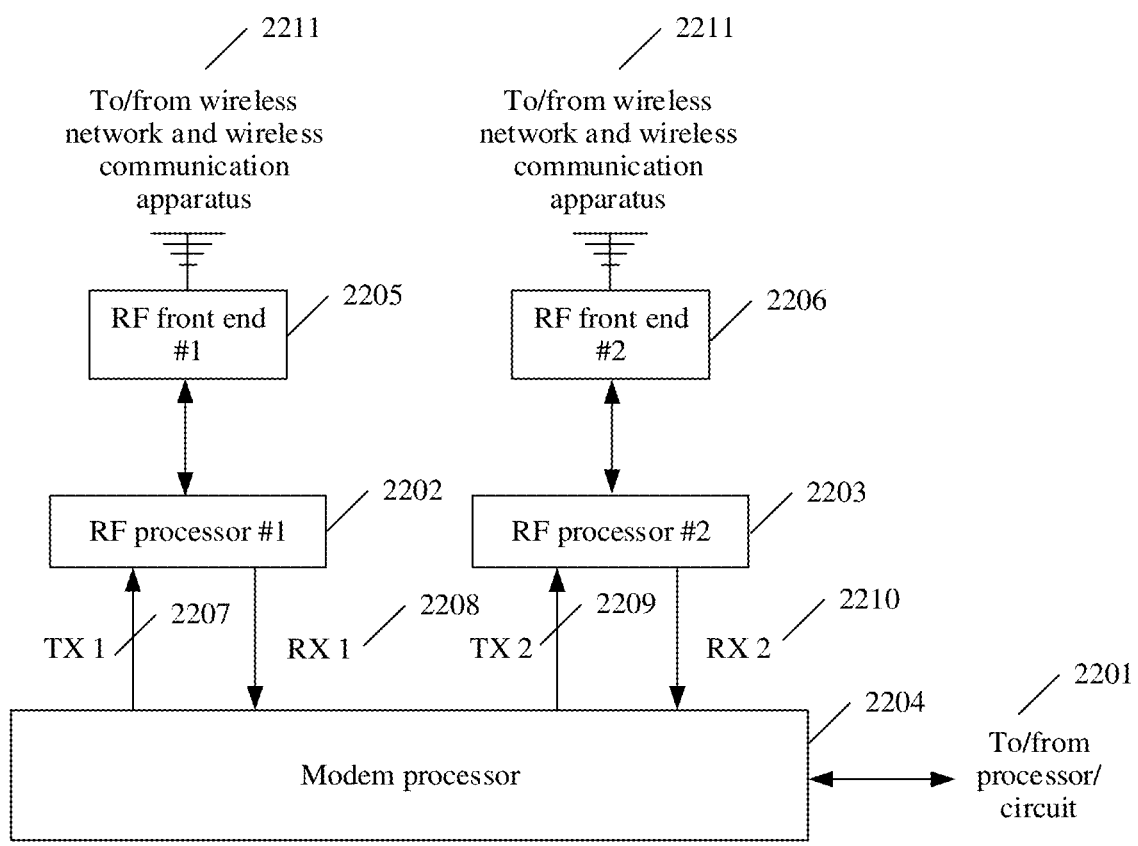
FIG. 22 is a block diagram of an example communication circuit according to an embodiment of this application.

FIG. 22 is a block diagram depicting examples of communication circuits 2103 (for example, communication interfaces/circuits 2003 and 2103) of the apparatus 2000 in FIG. 20 and the apparatus 2100 in FIG. 21. For simplicity, even if the communication circuit represents both a wireless communication circuit and a network communication circuit, the communication circuit is referred to as a communication circuit 2200 in FIG. 22 or a combined communication circuit 2200. In an example of FIG. 22, at least one transceiver chain is implemented. In this case, two transceiver chains that simultaneously operates are shown and implemented. A first transceiver chain includes a first radio frequency (RF) processor 2202 and a first RF front-end interface 2205. A second transceiver chain includes a second RF processor 2203 and a second RF front-end interface 2206. In addition, the first RF processor 2202 and the second RF processor 2203 is coupled to the first RF front-end interface 2205 and the second RF front-end interface 2206, respectively. Both the first RF processor 2202 and the second RF processor 2203 is coupled to a modem processor 2204. The modem processor 2204 sends a first transmission signal 2207 to the first RF processor 2202, and sends a second transmission signal 2209 to the second RF processor 2203. In addition, the modem processor 2204 further receives a first receive signal 2208 from the first RF processor 2202 and a second receive signal 2210 from the second RF processor 2203. For example, a to/from processor/circuit area 2201 guides the modem processor 2204 to a processor/circuit 2002 of the communication apparatus 2000 in FIG. 20 and to a processor/circuit 2102 of the communication apparatus 2100 in FIG. 21, respectively. Antennas from the first RF front-end interface 2205 and the second RF front-end interface 2206 guide to/from wireless networks and wireless communication apparatuses 2211.

Different embodiments provided in this application is combined. In the several embodiments provided in this application, the disclosed systems, apparatuses, and methods are implemented in another manner. For example, the described apparatus embodiments are examples. For example, the unit division is logical function division and is other division in actual implementation. For example, a plurality of units or components are combined or integrated into another system, or some features are ignored or not performed. In addition, the displayed or discussed mutual couplings or direct couplings or communication connections are implemented by using some interfaces. The indirect couplings or communication connections between the apparatuses or units are implemented in electronic, mechanical, or another form.

The units described as separate components is or is unable to be physically separate, and components displayed as units is or is unable to be physical units. The components are located at one position, or is distributed on a plurality of network units. Some or all of the units are selected based on actual conditions to achieve the objectives of the solutions in the embodiments.

In addition, functional units in the embodiments of this application is integrated into one processing unit, or each of the units exists alone physically, or two or more units are integrated into one unit. The integrated unit is implemented in a form of hardware, or is implemented in a form of a software function unit.

When the integrated unit is implemented in the form of a software function unit and sold or used as an independent product, the integrated unit is stored in a computer-readable storage medium. Based on such an understanding, the technical solutions of this application, or the part contributing to the prior art, or all or some of the technical solutions are implemented in a form of a software product. The computer software product is stored in a storage medium and includes several instructions for instructing a computer device (which is a personal computer, a server, or a network device, or the like) to perform all or some of the steps of the methods described in embodiments of this application. The foregoing storage medium includes: any medium that stores program code, such as a USB flash drive, a removable hard disk, a read-only memory (ROM, Read-Only Memory), a random-access memory (RAM, Random Access Memory), a magnetic disk, or an optical disc.

What is claimed is:

1. A data transmission method, comprising:
receiving, at a first terminal apparatus, at least two pieces of downlink control information from a first network apparatus in a first slot, wherein:
the at least two pieces of downlink control information include first and second downlink control information;
sending, based on the first downlink control information, first sidelink information to a second terminal apparatus on a first sidelink resource;
sending, based on the second downlink control information, second sidelink information to a third terminal apparatus on a second sidelink resource different from the first sidelink resource;
determining, based on the at least two pieces of downlink control information, a sequence of transport blocks included in the first sidelink information and in the second sidelink information; and
sending the second sidelink information to the second terminal apparatus on the second sidelink resource.

2. The method according to claim 1, wherein:

the first downlink control information and the second downlink control information are carried in a first control resource set (CORESET) and a second CORESET respectively; and sidelink information indicated by control information carried in the first control resource set includes a former data block, and sidelink information indicated by control information carried in the second CORESET includes a latter data block; or sidelink information indicated by control information carried in the first control resource set includes the latter data block, and sidelink information indicated by control information carried in the second CORESET includes the former data block.

3. The method according to claim 1, further comprising:
scrambling the first downlink control information using a first radio temporary identifier; and
scrambling the second downlink control information using a second radio temporary identifier; wherein:
the first radio temporary identifier indicates that the first sidelink information indicated by the first downlink control information comprises a former data block, and the second radio temporary identifier indicates that the second sidelink information indicated by the second downlink control information comprises a latter data block; or
the first radio temporary identifier indicates that the first sidelink information indicated by the first downlink control information comprises the latter data block, and the second radio temporary identifier indicates that the second sidelink information indicated by the second downlink control information comprises the former data block.

4. The method according to claim 1, wherein:
the first downlink control information includes first indication information, and the second downlink control information includes second indication information; and
the first indication information indicates that the first sidelink information indicated by the first downlink control information includes a former data block, and the second indication information indicates that the second sidelink information indicated by the second downlink control information includes a latter data block; or
the first indication information indicates that the first sidelink information indicated by the first downlink control information includes the latter data block, and the second indication information indicates that the second sidelink information indicated by the second downlink control information includes the former data block.

5. The method according to claim 4, wherein
the former data block is TB 0; and
the latter data block is TB 1.

6. A data transmission method, comprising:
determining at least two pieces of downlink control information, the at least two pieces of downlink control information include first downlink control information and second downlink control information;
sending, based on the first downlink control information used to indicate a first terminal apparatus, first sidelink information to a second terminal apparatus on a first sidelink resource;
sending, based on the second downlink control information used to indicate the first terminal apparatus, second sidelink information to a third terminal apparatus on a second sidelink resource;
determining, based on the at least two pieces of downlink control information, a sequence of transport blocks included in the first sidelink information and in the second sidelink information; and
sending the at least two pieces of downlink control information to the first terminal apparatus in a first slot.

7. The method according to claim 6, wherein:
the first downlink control information and the second downlink control information are carried in a first control resource set (CORESET) and a second CORESET; and sidelink information indicated by control information carried in the first control resource set includes a former data block, and sidelink information indicated by control information carried in the second CORESET includes a latter data block; or sidelink information indicated by control information carried in the first control resource set includes the latter data block, and sidelink information indicated by control information carried in the second CORESET includes the former data block.

8. The method according to claim 6, further comprising:
scrambling the first downlink control information using a first radio temporary identifier; and
scrambling the second downlink control information using a second radio temporary identifier; wherein:
the first radio temporary identifier indicates that the first sidelink information indicated by the first downlink control information includes a former data block, and the second radio temporary identifier indicates that the second sidelink information indicated by the second downlink control information includes a latter data block; or
the first radio temporary identifier indicates that the first sidelink information indicated by the first downlink control information includes the latter data block, and the second radio temporary identifier indicates that the second sidelink information indicated by the second downlink control information includes the former data block.

9. The method according to claim 6, wherein:
the first downlink control information includes first indication information, and the second downlink control information includes second indication information; and
the first indication information indicates that the first sidelink information indicated by the first downlink control information includes a former data block, and the second indication information indicates that the second sidelink information indicated by the second downlink control information includes a latter data block; or
the first indication information indicates that the first sidelink information indicated by the first downlink control information includes the latter data block, and the second indication information indicates that the second sidelink information indicated by the second downlink control information includes the former data block.

10. The method according to claim 8, wherein:
the former data block is TB 0; and
the latter data block is TB 1.

11. A communication apparatus, comprising;
one or more processors, and
a memory, operably coupled to the one or more processors, configured to store program instructions;
 wherein when executed by the one or more processors, the instructions cause the one or more processors to:
 receive, from a first terminal apparatus, at least two pieces of downlink control information from a first network apparatus in a first slot, the at least two pieces of downlink control information include first downlink control information and second downlink control information;
 send, based on the first downlink control information, first sidelink information to a second terminal apparatus on a first sidelink resource;
 send, based on the second downlink control information, second sidelink information to a third terminal apparatus on a second sidelink resource different from the first sidelink resource;
 determine, based on the at least two pieces of downlink control information, a sequence of transport blocks included in the first sidelink information and in the second sidelink information; and
send the second sidelink information to the second terminal apparatus on the second sidelink resource.

12. The communication apparatus according to claim 11, wherein:
 the first downlink control information and the second downlink control information are carried in a first control resource set (CORESET) and a second CORESET respectively; and
 sidelink information indicated by control information carried in the first control resource set includes a former data block, and sidelink information indicated by control information carried in the second CORESET includes a latter data block; or
 sidelink information indicated by control information carried in the first control resource set includes the latter data block, and sidelink information indicated by control information carried in the second CORESET includes the former data block.

13. The communication apparatus according to claim 11, wherein the instructions further cause the one or more processors to:
 scramble the first downlink control information using a first radio temporary identifier; and
 scramble the second downlink control information, using a second radio temporary identifier; wherein:
  the first radio temporary identifier indicates that the first sidelink information indicated by the first downlink control information includes a former data block, and the second radio temporary identifier indicates that the second sidelink information indicated by the second downlink control information includes a latter data block; or
  the first radio temporary identifier indicates that the first sidelink information indicated by the first downlink control information includes the latter data block, and the second radio temporary identifier indicates that the second sidelink information indicated by the second downlink control information includes the former data block.

14. The communication apparatus according to claim 11, wherein
 the first downlink control information includes first indication information, and the second downlink control information includes second indication information; and
 the first indication information indicates that the first sidelink information indicated by the first downlink control information includes a former data block, and the second indication information indicates that the second sidelink information indicated by the second downlink control information includes a latter data block; or
 the first indication information indicates that the first sidelink information indicated by the first downlink control information includes the latter data block, and the second indication information indicates that the second sidelink information indicated by the second downlink control information includes the former data block.

15. The communication apparatus according to claim 12, wherein:
 the former data block is TB 0; and
 the latter data block is TB 1.

16. A communication apparatus, comprising:
one or more processors, and
a memory, operably coupled to the one or more processors, configured to store program instructions;
 wherein when executed by the one or more processors, the instructions cause the one or more processors to:
  determine at least two pieces of downlink control information, the at least two pieces of downlink control information include first downlink control information and second downlink control information;
  send, based on the first downlink control information is used to indicate a first terminal apparatus, first sidelink information to a second terminal apparatus on a first sidelink resource;
  send, based on the second downlink control information is used to indicate the first terminal apparatus, second sidelink information to a third terminal apparatus on a second sidelink resource; and
  determine, based on the at least two pieces of downlink control information, a sequence of transport blocks included in the first sidelink information and in the second sidelink information; and
  send the at least two pieces of downlink control information to the first terminal apparatus in a first slot.

17. The communication apparatus according to claim 16, wherein:
 the first downlink control information and the second downlink control information are carried in a first control resource set (CORESET) and a second CORESET respectively; and
 sidelink information indicated by control information carried in the first control resource set includes a former data block, and sidelink information indicated by control information carried in the second CORESET includes a latter data block; or
 sidelink information indicated by control information carried in the first control resource set includes the latter data block, and sidelink information indicated by control information carried in the second CORESET includes the former data block.

18. The communication apparatus according to claim 16, wherein the instructions further cause the one or more processors to:

scramble the first downlink control information using a first radio temporary identifier; and
scramble the second downlink control information using a second radio temporary identifier; wherein
the first radio temporary identifier indicates that the first sidelink information indicated by the first downlink control information includes a former data block, and the second radio temporary identifier indicates that the second sidelink information indicated by the second downlink control information includes a latter data block; or
the first radio temporary identifier indicates that the first sidelink information indicated by the first downlink control information includes the latter data block, and the second radio temporary identifier indicates that the second sidelink information indicated by the second downlink control information includes the former data block.

19. The communication apparatus according to claim 16, wherein:
the first downlink control information includes first indication information, and the second downlink control information includes second indication information; and
the first indication information indicates that the first sidelink information indicated by the first downlink control information includes a former data block, and the second indication information indicates that the second sidelink information indicated by the second downlink control information includes a latter data block; or
the first indication information indicates that the first sidelink information indicated by the first downlink control information includes the latter data block, and the second indication information indicates that the second sidelink information indicated by the second downlink control information includes the former data block.

20. The communication apparatus according to claim 19, wherein:
the former data block is TB 0; and
the latter data block is TB 1.

\* \* \* \* \*